US006702437B2

(12) United States Patent
Fujimaki et al.

(10) Patent No.: US 6,702,437 B2
(45) Date of Patent: Mar. 9, 2004

(54) IMAGE RECORDING MATERIAL

(75) Inventors: Kazuhiro Fujimaki, Shizuoka-ken (JP); Tadahiro Sorori, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/223,700

(22) Filed: Aug. 20, 2002

(65) Prior Publication Data

US 2003/0146965 A1 Aug. 7, 2003

(30) Foreign Application Priority Data

Aug. 23, 2001 (JP) ....................................... 2001-253217

(51) Int. Cl.[7] ............................ B41J 2/01; B32B 33/00; B32B 9/00

(52) U.S. Cl. ....................................... 347/101; 428/40.2

(58) Field of Search ................................ 347/101, 105; 428/402, 40.1, 41.9, 42.1, 195, 913

(56) References Cited

U.S. PATENT DOCUMENTS 5,043,396 A * 8/1991 Kitahara et al. ......... 525/332.9

FOREIGN PATENT DOCUMENTS

EP 1 182 033 A1 2/2002 ............. B41C/1/10

* cited by examiner

*Primary Examiner*—Juanita Stephens
(74) *Attorney, Agent, or Firm*—Sughrue Mion, PLLC

(57) ABSTRACT

A negative image recording material on which an image is formable by exposure, comprising (A) a specific polymer compound that has at least one carbon—carbon double bond in a side chain thereof and a glass transition temperature of 80° C. or more, and is soluble in an aqueous alkaline solution, (B) a light-heat converting agent, and (C) a compound that generates radicals by exposure using light of a wavelength absorbable by the light-heat converting agent. The negative image recording material may also preferably includes (D) a radical-polymerizable compound. Preferably, the (A) specific polymer compound contains at least 1.5 meq/g of the carbon—carbon double bond in the side chain thereof.

16 Claims, No Drawings

IMAGE RECORDING MATERIAL

BACKGROUND OF THE INVENTION

1. Field of the Invention

The present invention relates to a heat mode-compatible negative image recording material on which an image is formable due to heat mode exposure using an infrared laser, and in particular to a negative image recording material that can form a planographic printing plate that has excellent printing resistance and in which the strength of an image portion is high.

2. Description of the Related Art

The development of lasers in recent years has been remarkable. In particular, high-output, compact solid-state lasers and semiconductor lasers having an emission range in the near infrared to infrared range (referred to as infrared lasers below) are being developed. These infrared lasers are extremely useful as an exposure light source at the time a printing plate is formed directly on the basis of digital data from a computer or the like.

Negative planographic printing plates exposable to an infrared laser use, as a recording layer, a negative image recording material that includes an infrared absorbent, a polymerization initiator that generates radicals by light or heat, and a polymerizable compound. Usually, the negative image recording material utilizes a recording system where the radicals generated by light or heat act as an initiator to trigger a polymerization reaction of the polymerizable compound, whereby the recording layer of the exposed region is cured to form an image portion.

Negative image forming materials have poor image formability in comparison with positive image forming materials, in which dissolution of the recording layer is caused by the energy from infrared laser irradiation. For this reason, negative image forming materials are generally heated prior to being developed in order to promote curing reaction by polymerization to form a stronger image portion.

As printing plates using a recording layer that utilize such an image forming mechanism, printing plates are known that use, as a recording layer (photosensitive layer), a photo- or heat-polymerizable composition, as disclosed in Japanese Patent Application Laid-Open (JP-A) Nos. 8-108621 and 9-34110. Although these recording layers have excellent high sensitive image formability, there are problems in that adhesion between the recording layer and the substrate is low and printing resistance is poor when a substrate that has been made hydrophilic is used as the support.

The use of high-output infrared lasers for exposure is also being studied in order to improve sensitivity, but there is a problem in that the optical system may be polluted due to ablation of the recording layer at the time of laser scanning.

SUMMARY OF THE INVENTION

It is an object of the present invention to provide a negative image recording material that can form a planographic printing plate that has excellent printing resistance and storage stability, in which the strength of an image portion is high, and in which an unwanted curing reaction arising during ordinary storage is suppressed.

As a result of extensive study, the present inventors found that, by selecting a polymer compound having an unsaturated bond in a side chain and a specific glass transition temperature as an alkali-soluble polymer compound used in an image recording material, excellent recording becomes possible in which the strength of an image portion is high.

Namely, a negative image recording material of the invention comprises: (A) a specific polymer compound that has at least one carbon—carbon double bond in a side chain thereof and a glass transition temperature of 80° C. or more, and is soluble in an aqueous alkaline solution; (B) a light-heat converting agent; and (C) a compound that generates radicals by heat mode exposure using light of a wavelength absorbable by the light-heat converting agent.

The negative image recording material may further comprise (D) a radical-polymerizable compound.

Although the mechanism resulting in the working of the invention is not entirely clear, it is thought that an image having excellent strength can be obtained because the glass transition temperature of the compound itself is at least 80° C., which is a comparatively high temperature, as a result of using, as the polymer compound soluble in an aqueous alkaline solution, a polymer compound that has at least one carbon—carbon double bond in a side chain thereof and a glass transition temperature of at least 80° C. Usually, a chemical reaction occurs more easily and excellent image formability is obtained with a fluidic material (i.e., a material that is flexible), with respect to materials that utilize a chemical reaction such as a polymerization reaction and a crosslinking reaction to form an image as in the case of negative image forming materials. However, the fact that the chemical reaction occurs easily conversely results in a reduction in stability. For instance, film remains at unexposed regions due to an undesired chemical reaction arising even under ordinary indoor and outdoor storage temperature conditions, and the non-image portion becomes easily contaminated when the material is used as a planographic printing plate. The polymer compound used in the invention has a reactive double bond, but because its glass transition temperature is high, the recording layer itself formed from this material also has a high glass transition temperature. A strong and rigid layer is formed that is not fluidic under ordinary indoor and outdoor storage temperature conditions. Under such conditions, the unexposed region has the characteristic of excellent stability, and the exposed region is heated by heat mode exposure to a temperature that is higher than the glass transition temperature, whereby the recording layer is instantaneously melted and becomes fluidic, a chemical reaction is triggered, curing is effected rapidly, and an image is formed. By using the specific alkali-soluble polymer compound of the invention in this manner, it is possible to obtain an image recording material that has both excellent storage stability and excellent image formability and, when this recording material is applied to the recording layer of a planographic printing plate, to obtain a printing plate that has excellent printing resistance and excellent storage stability.

In the invention, "heat mode-compatible" means that recording is possible by heat mode exposure. The definition of heat mode exposure in the invention will now be described in detail below. As described by Hans-Joachim Timpe in IS&Ts NIP 15: International Conference on Digital Printing Technologies, Orlando, Fla., (1999), p. 209, it is known that there are roughly two modes of processes by which an image is formed through a chemical change or a physical change resulting from light-excitation of a light-absorbing substance (e.g., a dye) in a photosensitive material. One mode is the so-called photon mode, in which the optically excited light-absorbing substance is inactivated by a photochemical interaction (e.g., energy transfer and electron transfer) with another reactive substance in the photosensitive material and the activated reactive substance triggers a chemical or physical change necessary to form an image. The other mode is the so-called heat mode, in which the optically excited light-absorbing material generates heat and is inactivated a reactive substance uses this heat to trigger a chemical or physical change necessary to form an image. Besides these modes, there are also special modes such as ablation, in which the substances are explosively scattered due to local concentration of light energy, and multiple photon absorption, in which a large number of photons are absorbed at once. However, description of these modes will be omitted here.

Exposure processes utilizing the respective modes described above are called photon mode exposure and heat mode exposure. The technical difference between photon mode exposure and heat mode exposure is whether or not the energy amount of the numerous photons to be exposed can be summed up and used with respect to the energy amount of the intended reaction. For example, let us suppose that "n" number of photons is utilized to initiate a certain reaction. Because photochemical interaction is utilized in photon mode exposure, the energy of plural photons cannot be added together and used due to the law of conservation of quantum energy and momentum. In order to cause some kind of reaction, it is necessary to satisfy a relationship in which the energy of one photon≧energy of the reaction. In heat-mode exposure, however, it becomes possible to sum up energy amount because heat is generated after optical excitation and optical energy is used after being converted to heat. Accordingly, a relationship in which the energy amount of 'n' photons≧reaction energy amount is sufficient. However, this energy amount summing is subject to restriction by heat diffusion. That is, if the next light excitation-inactivation process occurs and heat is generated before the previously generated heat is lost by heat diffusion from the exposed portion (reaction point), the heat almost invariably accumulates and the temperature of that portion rises. However, if the next generation of heat is delayed, the heat is lost and does not accumulate. That is, in heat mode exposure, the results are different between a case where light of a high energy amount is irradiated for a short period of time and a case where light of a low energy amount is irradiated for a long period of time, even if the total exposure energy amount is the same in the two cases. Irradiation over a short period of time is more effective for heat accumulation.

Of course, although there are cases in which a similar phenomenon occurs due to the influence of subsequently generated diffusion, this basically does not occur in photon mode exposure.

From the standpoint of the characteristics of the photosensitive material, in the photon mode, the inherent sensitivity (energy for the reaction necessary to form an image) of the photosensitive material is constant with respect to the exposure power density (w/$cm^2$) (=energy density per unit time). However, in the heat mode, the inherent sensitivity of the photosensitive material increases with to the exposure power density. Accordingly, if exposure time is fixed to the extent that productivity that is actually practically necessary can be maintained, it is ordinarily possible to increase sensitivity by about 0.1 mJ/$cm^2$ in the photon mode, but it becomes easy for low exposure fogging to occur in the unexposed portion because a reaction occurs regardless of how small the exposure amount is. In heat mode exposure, however, a reaction does not occur unless the exposure amount is higher than a certain level. Moreover, although about 50 mJ/$cm^2$ is ordinarily necessary in view of the relationship with the thermal stability of the photosensitive material, the problem of low exposure fogging can be avoided.

In heat mode exposure, it is necessary for the exposure power density at the plate surface of the photosensitive material to actually be at least 5000 W/$cm^2$ and preferably at least 10000 W/$cm^2$. However, although not stated in detail here, it is not preferably to utilize a high-power density laser of at least $5.0\times10^5$ W/$cm^2$ because of problems such as ablation, pollution of the light source, and the like.

DETAILED DESCRIPTION OF THE INVENTION

The negative image recording material of the present invention comprises (A) a specific polymer compound having at least one carbon—carbon double bond in a side chain thereof, having a glass transition temperature of 80° C. or more, and being soluble in an aqueous alkaline solution (also referred to hereinafter as the specific alkali-soluble polymer); (B) a light-heat converting agent; and (C) a compound forming radicals (also referred to hereinafter as the radical initiator) by light exposure by using light at a wavelength capable of being absorbed by the light-heat converting agent, characterized in that the negative image recording material is capable of forming an image by light exposure.

Hereinafter, the compounds which can be contained in the negative image recording material of the invention are described.

(A) Specific Alkali-Soluble Polymer

In the invention, the specific alkali-soluble polymer should have a glass transition temperature of 80° C. or more.

When the specific volume of a polymeric substance is measured as a function of temperature, the "glass transition temperature" (also referred to hereinafter as Tg) in the invention refers to a temperature corresponding to an intersecting point of the two straight lines, as defined in "Kobunshi Kagaku" (Polymer Chemistry) (published in 1993 by Kyoritsu Shuppan Co., Ltd.), and can be measured by a differential scanning calorimeter (DSC). The Tg of each polymer compound in the invention is also Tg measured by DSC.

The specific alkali-soluble polymer selected is the one having a Tg of 80° C. or more, more preferably 100° C. or more from the viewpoint of stability. The upper limit of the Tg is not particularly limited, but from the viewpoint of sensitivity and image formability, the Tg is preferably 250° C. or less.

The backbone structure of the alkali-soluble polymer having a Tg of 80° C. or more is not particularly limited because the polymer can have the desired Tg by introducing bulky functional groups such as alicyclic group and aromatic ring and cohesive functional groups such as amide group into units constituting each resin. As shown below, the backbone structure is preferably poly(meth)acryl-based resin, polystyrene-based resin, polyurethane-based resin and polyvinyl resin modified with acetal, among which polystyrene-based resin is preferable for use in a planographic printing plate in consideration of the influence thereof on other printing performance such as adhesion.

The specific alkali-soluble polymer used in the invention should have, in a side chain in the structure thereof, at least one carbon—carbon double bond, and in a preferable embodiment, the "carbon—carbon double bond" structure is a structure having, in a side chain thereof, at least one of the groups represented by the general formulae (1) to (3) below. This resin soluble in an aqueous alkaline solution and used as a binder resin in the negative image recording material has at least one "carbon—carbon double bond" in a side chain thereof, and this resin may have, in a side chain thereof, at least one of the groups represented by the general formulae (1) to (3) whose structure contains a "carbon—carbon double bond", and as a matter of course, the resin may have some or all of these groups simultaneously.

Hereinafter, the side chains represented by the general formulae (1) to (3) are described in detail.

(1)

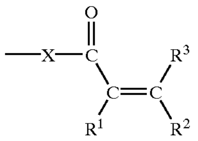

(2)

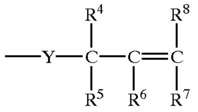

(3)

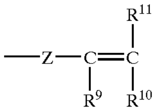

In the general formulae (1) to (3), $R^1$ to $R^{11}$ independently represent a monovalent organic group; X and Y independently represent an oxygen atom, sulfur atom or —N($R^{12}$)—; and Z represents an oxygen atom, sulfur atom, —N($R^{13}$)— or optionally substituted phenylene group.

(1)

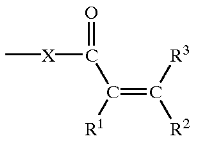

In the general formula (1) above, $R^1$ to $R^3$ independently represent a monovalent organic group, wherein $R^1$ preferably represents a hydrogen atom or an optionally substituted alkyl group among which a hydrogen atom or a methyl group is preferable because of higher radical reactivity. $R^2$ and $R^3$ independently represent a hydrogen atom, halogen atom, amino group, carboxyl group, alkoxy carbonyl group, sulfo group, nitro group, cyano group, optionally substituted alkyl group, optionally substituted aryl group, optionally substituted alkoxy group, optionally substituted aryloxy group, optionally substituted alkyl amino group, optionally substituted aryl amino group, optionally substituted alkyl sulfonyl group and optionally substituted aryl sulfonyl group, among which a hydrogen atom, carboxyl group, alkoxy carbonyl group, optionally substituted alkyl group and optionally substituted aryl group are preferable because of higher radical reactivity.

X represents an oxygen atom, sulfur atom or —N($R^{12}$)— in which $R^{12}$ represents a hydrogen atom or a monovalent organic group, wherein $R^{12}$ includes optionally substituted alkyl groups, among which a hydrogen atom, methyl group, ethyl group and isopropyl group are preferable because of higher radical reactivity.

The substituent group which may be introduced into the optionally substituted group includes an alkyl group, alkenyl group, alkynyl group, aryl group, alkoxy group, aryloxy group, halogen atom, amino group, alkyl amino group, aryl amino group, carboxyl group, alkoxy carbonyl group, sulfo group, nitro group, cyano group, amide group, alkyl sulfonyl group and aryl sulfonyl group.

(2)

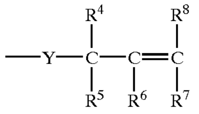

In the general formula (2), $R^4$ to $R^8$ independently represent a monovalent organic group, and preferably $R^4$ to $R^8$ represent a hydrogen atom, halogen atom, amino group, dialkyl amino group, carboxyl group, alkoxy carbonyl group, sulfo group, nitro group, cyano group, optionally substituted alkyl group, optionally substituted aryl group, optionally substituted alkoxy group, optionally substituted aryloxy group, optionally substituted alkyl amino group, optionally substituted aryl amino group, optionally substituted alkyl sulfonyl group and optionally substituted aryl sulfonyl group, among which a hydrogen atom, carboxyl group, alkoxy carbonyl group, optionally substituted alkyl group and optionally substituted aryl group are preferable.

The substituent group which may be introduced into the optionally substituted group includes those groups exemplified for the general formula (1). Y represents an oxygen atom, sulfur atom, or —N($R^{12}$)—. $R^{12}$ has the same meaning as of $R^{12}$ in the general formula (1), and preferable examples thereof are also those groups exemplified for the general formula (1).

(3)

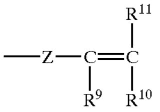

In the general formula (3) above, $R^9$ is preferably a hydrogen atom or an optionally substituted alkyl group among which a hydrogen atom or a methyl group is preferable because of higher radical reactivity. $R^{10}$ and $R^{11}$ independently represent a hydrogen atom, halogen atom, amino group, dialkyl amino group, carboxyl group, alkoxy carbonyl group, sulfo group, nitro group, cyano group, optionally substituted alkyl group, optionally substituted aryl group, optionally substituted alkoxy group, optionally substituted aryloxy group, optionally substituted alkylamino group, optionally substituted arylamino group, optionally substituted alkyl sulfonyl group and optionally substituted aryl sulfonyl group, among which a hydrogen atom, carboxyl group, alkoxy carbonyl group, optionally substituted alkyl group and optionally substituted aryl group are preferable because of higher radical reactivity.

The substituent group which may be introduced into the optionally substituted group includes those groups exemplified for the general formula (1). Z represents an oxygen atom, sulfur atom, —N($R^{12}$)—, or optionally substituted phenylene group. $R^{12}$ has the same meaning as that of $R^{12}$ in the general formula (1), and preferable examples thereof are also those groups exemplified in the general formula (1).

The backbone structure of the specific alkali-soluble polymer according to the invention is preferably poly(meth) acryl-based resin, polystyrene-based resin, polyurethane-based resin, and polyvinyl resin modified with acetal, among which polystyrene-based resin is particularly preferable because of higher glass transition temperature. As used herein, the polystyrene-based resin refers to that having a polymer structure containing units derived from styrene derivatives, and for higher glass transition temperature, the polystyrene-based resin contains preferably at least 30 mol-% (more preferably at least 50 mol-%) units derived from styrene derivatives, relative to the total units (100%) of the polymer. Further, the side-chain structures represented by the general formulae (1), (2) and (3) are linked preferably to the styrene derivative units.

The structure of the unit derived from a styrene derivative is preferably a structure represented by the general formula (4):

(4)

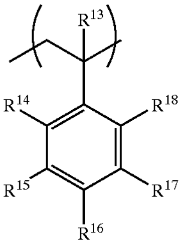

in which $R^{13}$ represents a hydrogen atom or a $C_{1-5}$ alkyl group.

In this formula, $R^{14}$ to $R^{18}$ independently represent a monovalent organic group, preferably a hydrogen atom, halogen atom, alkyl group, aromatic group, heterocyclic group, hydroxyl group, alkoxy group, aryloxy group, mercapto group, alkyl thio group, aryl thio group, alkyl dithiol group, aryl dithio group, amino group, N-alkyl amino group, N,N-dialkyl amino group, N-aryl amino group, N,N-diaryl amino group, N-alkyl-N-aryl amino group, acyloxy group, carbamoyloxy group, N-alkylcarbamoyloxy group, N-aryl carbamoyloxy group, N,N-dialkyl carbamoyloxy group, N,N-diaryl carbamoyloxy group, N-alkyl-N-aryl carbamoyloxy group, alkyl sulfoxy group, aryl sulfoxy group, acyl thio group, acyl amino group, N-alkyl acyl amino group, N-aryl acyl amino group, ureido group, N-alkyl ureido group, N,N-dialkyl ureido group, N-aryl ureido group, N,N-diaryl ureido group, N-alkyl-N-aryl ureido group, N-alkyl ureido group, N-aryl ureido group, N-alkyl-N-alkyl ureido group, N-alkyl-N-aryl ureido group, N,N-dialkyl-N-alkyl ureido group, N,N-dialkyl-N-aryl ureido group, N-aryl-N-alkyl ureido group, N-aryl-N-aryl ureido group, N,N-diaryl-N-alkyl ureido group, N,N-diaryl-N-aryl ureido group, N-alkyl-N-aryl-N-alkyl ureido group, N-alkyl-N-aryl-N-aryl ureido group, alkoxy carbonyl amino group, aryloxy carbonyl amino group, N-alkyl-N-alkoxycarbonyl amino group, N-alkyl-N-aryloxy carbonyl amino group, N-aryl-N-alkoxycarbonyl amino group, N-aryl-N-aryloxycarbonyl amino group, formyl group, acyl group, carboxyl group and its conjugated basic group (referred to hereinafter as carboxylate), alkoxy carbonyl group, aryloxy carbonyl group, carbamoyl group, N-alkyl carbamoyl group, N,N-dialkyl carbamoyl group, N-aryl carbamoyl group, N,N-diaryl carbamoyl group, N-alkyl-N-aryl carbamoyl group, alkyl sulfinyl group, aryl sulfinyl group, alkyl sulfonyl group, aryl sulfonyl group, sulfo group ($—SO_3H$) and its conjugated base (referred to hereinafter as sulfonate group); and alkoxy sulfonyl group, aryloxy sulfonyl group, sulfinamoyl group, N-alkyl sulfinamoyl group, N,N-dialkyl sulfinamoyl group, N-aryl sulfinamoyl group, N,N-diaryl sulfinamoyl group, N-alkyl-N-aryl sulfinamoyl group, sulfamoyl group, N-alkyl sulfamoyl group, N,N-dialkyl sulfamoyl group, N-aryl sulfamoyl group, N,N-diaryl sulfamoyl group, N-alkyl-N-aryl sulfamoyl group, N-acyl sulfamoyl group and its conjugated basic group, N-alkyl sulfonyl sulfamoyl group ($—SO_2NHSO_2$ (alkyl)) and its conjugated base, N-aryl sulfonyl sulfamoyl group ($—SO_2NHSO_2$ (alkyl)) and its conjugated base, N-alkyl sulfonyl carbamoyl group ($—CONHSO_2$ (alkyl)) and its conjugated base, N-aryl sulfonyl carbamoyl group ($—CONHSO_2$ (allyl)) and its conjugated base, alkoxy silyl group ($—Si(Oalkyl)_3$), aryloxy silyl group ($—Si(Oallyl)_3$), hydroxylyl group ($—Si(OH)_3$) and its conjugated base, phosphono group ($—PO_3H_2$) and is conjugated basic group (referred to hereinafter as phosphonate group), dialkyl phosphono group ($—PO_3$ $(alkyl)_2$) diaryl phosphono group ($—PO_3$ $(aryl)_2$), alkyl aryl phosphono group ($—PO_3$ (alkyl) (aryl)), monoalkyl phosphono group ($—PO_3H$ (alkyl)) and its conjugated basic group (referred to hereinafter as alkyl phosphonate group), monoaryl phosphono group ($—PO_3H$ (aryl)) and its conjugated basic group (referred to hereinafter as aryl phosphonate group), phosphonoxy group ($—OPO_3H_2$) and its conjugated basic group (referred to hereinafter as phosphonatoxy group), dialkyl phosphonoxy group ($—OPO_3$ $(alkyl)_2$), diaryl phosphonoxy group ($—OPO_3$ $(aryl)_2$), alkyl aryl phosphonoxy group ($—OPO_3$ (alkyl) (aryl)), monoalkyl phosphonoxy group ($—OPO_3H$ (alkyl)) and its conjugated basic group (referred to hereinafter as alkyl phosphonatoxy group), monoaryl phosphonoxy group ($—OPO_3H$ (aryl)) and its conjugated basic group (referred to hereinafter as aryl phosphonatoxy group), cyano group and nitro group.

The structure in which a side-chain structure selected from the general formulae (1) to (3) above has been linked to the styrene derivative unit is preferably a structure represented by the following formula (5):

(5)

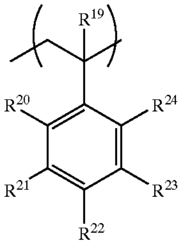

In the general formula (5), $R^{19}$ represents a hydrogen atom or a $C_{1-5}$ alkyl group. $R^{20}$ to $R^{24}$ independently represent a monovalent organic group, at least one of which has a structure represented by the general formula (1), (2) or (3). Monovalent organic groups other than the organic groups selected from the general formulae (1) to (3) include those groups exemplified above as $R^{14}$ to $R^{18}$ in the general formula (4).

The method of introducing an unsaturated group selected from the general formulae (1) to (3) to a side chain consisting of styrene derivative units includes, but is not limited to, the following methods.

Synthesis Method 1)

A method in which one or more radical-polymerizable compounds represented by the general formula (6) below are copolymerized with one another, or one or more radical-polymerizable compounds represented by the general formula (6) are copolymerized with at least one or more other radical-polymerizable compounds not having the groups described above, to synthesize a precursor of the desired polymer compound by usual radical polymerization, followed by deprotonation thereof with a base thereby eliminating Z to give the desired polymer compound.

A precursor of the polymer compound can be produced by any methods known in the art, such as suspension polymerization or solution polymerization. The copolymer may be constituted to be a block copolymer, random copolymer or graft polymer.

(6)

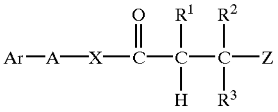

In the general formula (6) above, Ar represents an optionally substituted styryl group and α-methyl styryl group; Z represents an anionic eliminating group; Q represents an oxygen atom, —NH— or —$NR^4$—; $R^4$ represent a hydrogen atom or an optionally substituted alkyl group; and A represents a divalent organic linking group.

The usable radical-polymerizable compound represented by the general formula (6) includes, but is not limited to, the compounds described below:

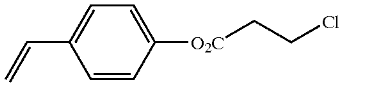

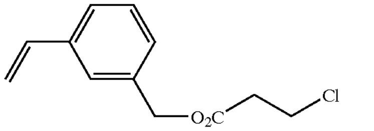

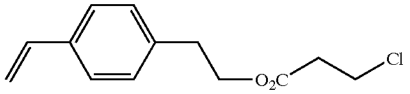

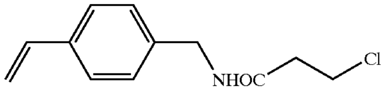

The base used in deprotonation may be either an inorganic or organic compound. Preferable examples of the inorganic compound as the base include sodium hydroxide, potassium hydroxide, sodium carbonate, sodium bicarbonate, potassium carbonate and potassium bicarbonate, and preferable examples of the organic compound as the base include metal alkoxides such as sodium methoxide, sodium ethoxide and potassium t-butoxide, and organic amine compounds such as triethyl amine, pyridine, and diisopropyl ethylamine.

Synthesis Method 2)

A method in which one or more radical-polymerizable compounds having functional groups are copolymerized with one another, or one or more radical-polymerizable compounds having functional groups are copolymerized with other radical-polymerizable compound not having the groups described above, to synthesize a backbone polymer compound (polymer compound constituting the backbone) by radical polymerization, followed by reacting the functional groups in its side chains with a low-molecular compound having the structure of the general formula (1B) below or the general formula (2) above to give the desired polymer compound.

The backbone polymer compound can be produced by any methods known in the art, such as suspension polymerization or solution polymerization. The copolymer may be constituted to be a block copolymer, random copolymer or graft polymer.

(1B)

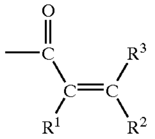

In the general formula (1B), $R^1$ to $R^3$ have the same meaning as in the general formula (1) above.

In the radical-polymerizable compounds having functional groups, the functional groups include e.g. a hydroxyl group, carboxyl group, carboxylic halide group, carboxylic anhydride group, amino group, halogenated alkyl group, isocyanate group, epoxy group, oxazoline group and oxime group. The radical-polymerizable compounds having these functional groups include 4-hydroxy styrene, 3-hydroxymethyl styrene, 4-(2-hydroxyethyl) styrene, 4-chloromethyl styrene, 4-carboxyl styrene, 4-aminostyrene and 4-methyl aminostyrene.

Compounds having the groups represented by the general formula (1B) include e.g. 2-hydroxylethyl acrylate, 2-hydroxyethyl methacrylate, 4-hydroxybutyl acrylate, 4-hydroxybutyl methacrylate, acrylic acid, methacrylic acid, acrylic chloride, methacrylic chloride, methacrylic anhydride, N,N-dimethyl-2-aminoethyl methacrylate, 2-chloroethyl methacrylate, 3-bromopropyl acrylate, 6-bromohexyl acrylate, 3-bromopropyl methacrylate, 6-bromohexyl methacrylate, 2-isocyanate ethyl methacrylate, glycidyl acrylate and glycidyl methacrylate.

In the invention, the specific alkali-soluble polymer compound having the group of formula (2) in a side chain thereof can be produced by at least one of synthesis methods shown in 3) and 4) below.

Synthesis Method 3)

A method in which one or more radical-polymerizable compounds having both the unsaturated group represented by the general formula (2) and an ethylenically unsaturated group more reactive in addition polymerization than said unsaturated group are polymerized if necessary with other radical-polymerizable compounds, to give the polymer compound.

The radical-polymerizable compound having both the unsaturated group represented by the general formula (2) and an ethylenically unsaturated group more reactive in addition polymerization than said unsaturated group, used in Synthesis Method 3), includes e.g. 4-aryloxy styrene, 4-(2-aryloxy)ethyl styrene, 3-aryloxymethyl styrene and 4-(N-allyl) aminostyrene.

Synthesis Method 4)

A method in which one or more radical-polymerizable compounds having a functional group are polymerized to synthesize the polymer compound which is then reacted with a compound having a side-chain functional group and the structure shown in the general formula (2B), to introduce this compound into the polymer compound.

(2B)

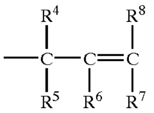

The polymer compound obtained by polymerizing one or more radical-polymerizable compounds having a functional group includes e.g. the compounds enumerated above in Synthesis Method 2).

The compound having the structure shown in the general formula (2B) used in Synthesis Example 4) includes e.g. allyl bromide, allyl alcohol, allyl amine, diallyl amine, 2-aryloxyethyl alcohol, 2-chloro-1-butene and allyl isocyanate.

The specific alkali-soluble polymer compound having, in a side chain thereof, the group represented by the general formula (3) in the invention can be synthesized by Synthesis Method 5) shown below.

Synthesis Method 5)

A method in which one or more radical-polymerizable compounds having a functional group are polymerized to synthesize a polymer compound and then reacted with a compound having a side-chain functional group and the structure represented by the general formula (3B), to introduce this compound into the polymer compound.

(3B)

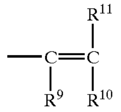

The polymer compound obtained by polymerizing one or more radical-polymerizable compounds having a functional group include the compounds exemplified above in Synthesis Method 2).

The compound having the structure represented by the general formula (3B) used in Synthesis Method 5 includes e.g. 2-hydroxyethyl monovinyl ether, 4-hydroxybutyl monovinyl ether, diethylene glycol monovinyl ether, 2-chloroethyl vinyl ether, 1-aminoethyl vinyl ether, 4-hydroxystyrene, 3-hydroxymethyl styrene, 4-(2-hydroxyethyl) styrene, 4-chloromethyl styrene, 4-carboxyl styrene, 4-aminostyrene and 4-methylaminostyrene.

The specific alkali water-soluble polymer may also be obtained by using one of these production methods (synthesis methods) or a combination thereof.

Moreover, the structural unit having a side chain "carbon—carbon doublebond" represented by general formulae (1) to (3) may contain materials other than the styrene derivative structural unit represented by formula (5). Specific examples thereof include those disclosed in Japanese Patent Application No. 2000-249569.

The resultant specific alkali water-soluble polymers can be contained alone or as a combination thereof in the image forming material of the invention.

The content of "a carbon—carbon double bond of side chain" is preferably set to not less than 1.5 meq/g, more preferably 1.5 to 7.0 meq/g, when represented by equivalent number per polymer compound of 1 gram. If the content is lower than 1.5 meq/g, the curing property becomes insufficient, failing to provide sufficient image intensity. If the content is higher than 7.0 meq/g, the storage stability is lowered.

In order to set the glass transition temperature higher, it is effective to allow the polymer compound of the present invention to contain at least one amide group in its side chain. Here, the side chain amide group is also effective to improve properties such as resistance to printing and a non-image-portion removing property.

A preferable side chain amide group is represented by the following formula (1):

(1)

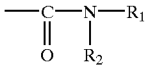

$R^1$ and $R^2$ independently represent a monovalent organic group. Preferably, these represent a hydrogen atom or an optionally substituted alkyl group, alkenyl group, alkynyl group, aryl group, heterocyclic group or alicyclic group, and $R^1$ and $R^2$ may be bonded to form a ring structure.

Examples of alkyl group include a straight-chain, a branched and a cyclic alkyl group containing 1 to 20 carbon atoms; and specific examples include methyl group, ethyl group, propyl group, butyl group, pentyl group, hexyl group, heptyl group, octyl group, nonyl group, decyl group, undecyl group, dodecyl group, tridecyl group, hexadecyl group, octadecyl group, eicosyl group, isopropyl group, isobutyl group, s-butyl group, t-butyl group, isopentyl group, neopentyl group, 1-methylbutyl group, isohexyl group, 2-ethylhexyl group, 2-methylhexyl group, cyclohexyl group, cyclopentyl group and 2-norbornyl group. Among these, a straight-chain alkyl group containing 1 to 12 carbon atoms, a branched alkyl group containing 3 to 12 carbon atoms and a ring-shaped alkyl group containing 5 to 10 carbon atoms are more preferably used.

With respect to the substituents of the substituted alkyl group, groups of monovalent non-metal atoms except for hydrogen atom are used, and preferable examples thereof include: halogen atom (—F, —Br, —Cl, —I), hydroxyl group, alkoxy group, aryloxy group, mercapto group, alkyl thio group, aryl thio group, alkyl dithio group, aryl dithio group, amino group, N-alkyl amino group, N,N-dialkyl amino group, N-aryl amino group, N,N-diaryl amino group, N-alkyl-N-aryl amino group, acyloxy group, carbamoyloxy group, N-alkyl carbamoyloxy group, N-aryl carbamoyloxy group, N,N-dialkyl carbamoyloxy group, N,N-diaryl carbamoyloxy group, N-alkyl-N-aryl carbamoyloxy group, alkyl sulfoxy group, aryl sulfoxy group, acyl thio group, acyl amino group, N-alkyl acyl amino group, N-aryl acyl amino group, ureido group, N'-alkyl ureido group, N',N'-dialkyl ureido group, N'-aryl ureido group, N',N'-diaryl ureido group, N'-alkyl-N'-aryl ureido group, N-alkyl ureido group, N-aryl ureido group, N'-alkyl-N-alkyl ureido group, N'-alkyl-N-aryl ureido group, N',N'-dialkyl-N-alkyl ureido group, N',N'-dialkyl-N-aryl ureido group, N'-aryl-N-alkyl ureido group, N'-aryl-N-aryl ureido group, N',N'-diaryl-N-alkyl ureido group, N',N'-diaryl-N-aryl ureido group, N'-alkyl-N'-aryl-N-alkyl ureido group, N'-alkyl-N'-aryl-N-aryl ureido group, alkoxy carbonyl amino group, aryloxy carbonyl amino group, N-alkyl-N-alkoxy carbonyl amino group, N-alkyl-N-aryloxy carbonyl amino group, N-aryl-N-alkoxy carbonyl amino group, N-aryl-N-aryloxy carbonyl amino group, formyl group, acyl group, carboxyl group, alkoxy carbonyl group, aryloxy carbonyl group, carbamoyl group, N-alkyl carbamoyl group, N,N-dialkyl carbamoyl group, N-aryl carbamoyl group, N,N-diaryl carbamoyl group, N-alkyl-N-aryl carbamoyl group, alkyl sulfinyl group, aryl sulfinyl group, alkyl sulfonyl group, aryl sulfonyl group, sulfo group (—$SO_3H$) and its conjugated base (referred to hereinafter as sulfonate group); alkoxy sulfonyl group, aryloxy sulfonyl group, sulfinamoyl group, N-alkyl sulfinamoyl group, N,N-dialkyl sulfinamoyl group, N-aryl sulfinamoyl group, N,N-diaryl sulfinamoyl group, N-alkyl-N-aryl sulfinamoyl group, sulfamoyl group, N-alkyl sulfamoyl group, N,N-dialkyl sulfamoyl group, N-aryl sulfamoyl group, N,N-diaryl sulfamoyl group, N-alkyl-N-aryl sulfamoyl group, phosphono group (—$PO_3H_2$) and its conjugated basic group (referred to hereinafter as phosphonate group), dialkyl phosphono group (—$PO_3$ (alkyl)$_2$: alkyl=alkyl group, the same is true in the following description), diaryl phosphono group (—$PO_3$ (aryl)$_2$: aryl=aryl group, the same is true in the following description) alkyl aryl phosphono group (—PO, (alkyl) (aryl)), monoalkyl phosphono group (—$PO_3$ (alkyl)) and its conjugated basic group (referred to hereinafter as alkyl phosphonate group) monoaryl phosphono group (—$PO_3H$ (aryl)) and its conjugated basic group (referred to hereinafter as aryl phosphonate group), phosphonoxy group (—$OPO_3H_2$) and its conjugated basic group (referred to hereinafter as phosphonatoxy group), dialkyl phosphonoxy group (—$OPO_3H$ (alkyl),$_2$), diaryl phosphonoxy group (—$OPO_3$ (aryl)$_2$), alkyl aryl phosphonoxy group (—$OPO_3$ (alkyl) (aryl)), monoalkyl phosphonoxy group (—$OPO_3H$ (alkyl)) and its conjugated basic group (referred to hereinafter as alkyl phosphonatoxy group), monoaryl phosphonoxy group (—$OPO_3H$ (aryl)) and its conjugated basic group (referred to hereinafter as aryl phosphonatoxy group), cyano group, nitro group, aryl group, alkenyl group, alkynyl group, heterocyclic group, silyl group, etc.

With respect to the specific examples of alkyl groups in these substituents, the aforementioned alkyl groups are listed, and specific examples of aryl groups include: phenyl group, biphenyl group, naphthyl group, tolyl group, xylyl group, mesityl group, cumenyl group, chlorophenyl group, bromophenyl group, chloromethyl phenyl group, hydroxyl phenyl group, methoxy phenyl group, ethoxy phenyl group, phenoxy phenyl group, acetoxyphenyl group, benzoyloxy phenyl group, methyl thio phenyl group, phenyl thio phenyl group, methyl amino phenyl group, dimethyl amino phenyl group, acetyl amino phenyl group, carboxy phenyl group, methoxy carbonyl phenyl group, ethoxyphenyl carbonyl group, phenoxy carbonyl phenyl group, N-phenyl carbamoyl phenyl group, cyanophenyl group, sulfophenyl group, sulfonate phenyl group, phosphono phenyl group, phosphonate phenyl group, etc.

Moreover, examples of the alkenyl group include: vinyl group, 1-propenyl group, 1-butenyl group, cinnamyl group, 2-chloro-1-ethenyl group, etc. are listed, and examples of the alkynyl group include ethenyl group, 1-propynyl group, 1-butynyl group, trimethylsilyl ethenyl group, etc.

With respect to R01 in the acyl group (R01CO—), examples thereof include hydrogen atom, and the above-mentioned alkyl groups and aryl groups. Among these substituents, more preferable examples include: halogen atom (—F, —Br, —Cl, —I), alkoxy group, aryloxy group, alkyl thio group, aryl thio group, N-alkyl amino group, N,N-dialkyl amino group, acyloxy group, N-alkyl carbamoyloxy group, N-aryl carbamoyloxy group, acyl amino group, formyl group, acyl group, carboxyl group, alkoxy carbonyl group, aryloxy carbonyl group, carbamoyl group, N-alkyl carbamoyl group, N,N-dialkyl carbamoyl group, N-aryl carbamoyl group, N-alkyl-N-aryl carbamoyl group, sulfo group, sulfonate group, sulfamoyl group, N-alkyl sulfamoyl group, N,N-dialkyl sulfamoyl group, N-aryl sulfamoyl group, N-alkyl-N-aryl sulfamoyl group, phosphono group, phosphonate group, dialkyl phosphono group, diaryl phosphono group, monoalkyl phosphono group, alkyl phosphonate group, monoaryl phosphono group, aryl phosphono group, phosphonoxy group, phosphonatoxy group, aryl group, alkenyl group, etc.

Examples of heterocyclic groups include pyridyl group, piperidyl group, etc. Examples of silyl groups include trimethyl silyl group, etc.

Here, with respect to alkylene groups in the substituted alkyl group, those from which any one of hydrogen atoms on the above-mentioned alkyl group containing 1 to 20 carbon atoms is excluded to form divalent organic residues, and preferable examples include straight-chain alkylene groups containing 1 to 12 carbon atoms, branched alkylene groups containing 3 to 12 carbon atoms and cyclic alkylene groups containing 5 to 10 carbon atoms. Preferable examples of substituted alkyl groups obtained by combining these substituents and alkylene groups include: chloromethyl group, bromomethyl group, 2-chloroethyl group, trifluoro methyl group, methoxymethyl group, isopropoxy methyl group, butoxy methyl group, s-butoxy butyl group, methoxy ethoxy ethyl group, aryloxy methyl group, phenoxy methyl group, methyl thio methyl group, tolyl thio methyl group, pyridyl methyl group, tetramethyl piperidinyl methyl group, N-acetyl tetramethyl piperidinyl methyl group, trimethyl silyl methyl group, methoxy ethyl group, ethyl amino ethyl group, diethyl amino propyl group, morpholinopropyl group, acetyloxy methyl group, benzoyloxy methyl group, N-cyclohexyl carbamoyloxy ethyl group, N-phenyl carbamoyloxy ethyl group, acetyl amino ethyl group, N-methyl benzoyl amino propyl group, 2-oxoethyl group, 2-oxopropyl group, carboxy propyl group, methoxy carbonyl ethyl group, allyloxy carbonyl butyl group, chlorophenoxy carbonyl methyl group, carbamoyl methyl group, N-methyl carbamoyl ethyl group, N,N-dipropyl carbamoyl methyl group, N-(methoxy phenyl) carbamoyl ethyl group, N-methyl-N-(sulfonyl) carbamoyl methyl group, sulfo butyl group, sulfonate butyl group, sulfamoyl butyl group, N-ethyl sulfamoylmethyl group, N,N-dipropyl sulfamoylpropyl group, N-tolyl sulfamoyl propyl group, N-methyl-N-(phosphono phenyl) sulfamoyl octyl group, phosphono butyl group, phosphonate hexyl group, diethyl phosphono butyl group, diphenyl phosphono propyl group, methyl phosphono butyl group, methyl phosphonate butyl group, tolyl phosphono hexyl group, tolyl phosphonate hexyl group, phosphonoxy propyl group, phosphonatoxy butyl group, benzyl group, phenetyl group, a-methyl benzyl group, 1-methyl-1-phenyl ethyl group, p-methyl benzyl group, cinnamyl group, allyl group, 1-propenyl methyl group, 2-butenyl group, 2-methyl allyl group, 2-methyl propenyl methyl group, 2-propynyl group, 2-butynyl group, 3-butynyl group, etc.

Next, with respect to aryl groups serving as $R^1$ to $R^7$, those in which one to three benzene rings form a condensed ring and those in which a benzene ring and a 5-member unsaturated ring form a condensed ring are listed, and specific examples thereof include: phenyl group, naphthyl group, anthryl group, phenanthryl group, indenyl group, acetonaphthyl group, fluorenyl group, etc., and among these, phenyl group and naphthyl group are preferably used.

With respect to substituted aryl groups, those in which a group that consists of monovalent non-metal atomic group except for hydrogen atoms is placed on ring-forming carbon atoms of the above-mentioned aryl group as a substituent group are used. Examples of preferable substituents include the above-mentioned alkyl groups, substituted alkyl groups and those described earlier as substituents in substituted alkyl groups. Specific examples of preferable substituted aryl groups include: biphenyl group, tolyl group, xylyl group, mesityl group, cummenyl group, chlorophenyl group, bromophenyl group, fluorophenyl group, chloromethyl phenyl group, trifluoro methyl phenyl group, hydroxy phenyl group, methoxy phenyl group, methoxyethoxy phenyl group, allyloxy phenyl group, phenoxy phenyl group, methyl thio phenyl group, tolyl thio phenyl group, ethyl amino phenyl group, diethyl amino phenyl group, morpholino phenyl group, acetyl oxyphenyl group, benzoyl oxyphenyl group, N-cyclohexyl carbamoyl oxyphenyl group, N-phenyl carbamoyl oxyphenyl group, acetyl aminophenyl group, N-methyl benzoyl amino phenyl group, carboxy phenyl group, methoxy carbonyl phenyl group, allyloxy carbonyl phenyl group, chlorophenoxy carbonyl phenyl group, carbamoyl phenyl group, N-methyl carbamoyl phenyl group, N,N-dipropyl carbamoyl phenyl group, N-(methoxyphenyl) carbamoyl phenyl group, N-methyl-N-(sulfonyl) carbamoyl phenyl group, sulfophenyl group, sulfonate phenyl group, sulfamoyl phenyl group, N-ethylsulfamoyl phenyl group, N,N-dipropyl sulfamoyl phenyl group, N-tolyl sulfamoyl phenyl group, N-methyl-N-(phosphono phenyl) sulfamoyl phenyl group, phosphono phenyl group, phosphonate phenyl group, diethyl phosphono phenyl group, diphenyl phosphono phenyl group, methyl phosphono phenyl group, methyl phosphonate phenyl group, tolyl phosphono phenyl group, tolyl phosphonate phenyl group, allyl phenyl group, 1-propenyl methyl phenyl group, 2-butenyl phenyl group, 2-methyl allyl phenyl group, 2-methyl propenyl phenyl group, 2-propynyl phenyl group, 2-butynyl phenyl group, 3-butynyl phenyl group, etc.

With respect to the alkenyl group, substituted alkenyl group, alkynyl group and substituted alkynyl group (—C(R02)═C(R03)(R04), and —C≡C(R05), those groups in which R02, R03, R04, R05 are constituted by a monovalent non-metal atomic group maybe used. Examples of preferable R02, R03, R04 and R05 include hydrogen atom, halogen atom, alkyl group, substituted alkyl group, aryl group and substituted aryl group, etc. Specific examples of these include the same materials as described in the above-mentioned examples. More preferable examples of R02, R03, R04 and R05 include hydrogen atom, halogen atom and straight-chain, branched and cyclic alkyl groups containing 1 to 10 carbon atoms. With respect to preferable alkenyl group, substituted alkenyl group, alkynyl group and substituted alkynyl group represented by $R^1$ to $R^7$, examples thereof include vinyl group, 1-propenyl group, 1-butenyl group, 1-pentenyl group, 1-hexenyl group, 1-octenyl group, 1-methyl-1-propenyl group, 2-methyl-1-propenyl group, 2-methyl-1-butenyl group, 2-phenyl-1-ethenyl group, 2-chloro-1-ethenyl group, ethenyl group, 1-propynyl group, 1-butynyl group and phenyl ethenyl group.

With respect to rings formed by joining $R^1$ and $R^2$ to each other in general formula (1), examples thereof include morpholine, piperazine, pyrrolidine, pyrrole and indoline. These may be substituted by the above-mentioned substituents. Among these, those having an aliphatic ring are preferably used.

With respect to $R^1$ and $R^2$ in formula (1), hydrogen atom, alkyl group, alkenyl group, aryl group are preferably used. Moreover, $R^1$ and R2 may preferably form an aliphatic ring.

More preferable examples include acrylamides such as acrylamide and N-alkyl acrylamide (for example, N-methyl acrylamide, N-ethyl acrylamide, N-propyl acrylamide, N-isopropyl acrylamide, morpholyl acrylamide, piperidyl acrylamide, N-butyl acrylamide, N-sec-butyl acrylamide, N-t-butyl acrylamide, N-hexyl acrylamide, N-cyclohexyl acrylamide, N-phenyl acrylamide, N-naphthyl acrylamide, N-hydroxymethyl acrylamide, N-hydroxyethyl acrylamide, N-allyl acrylamide, N-propargyl acrylamide, 4-hydroxy phenyl acrylamide, 2-hydroxy phenyl acrylamide, N,N-dimethyl acrylamide, N,N-diethyl acrylamide, N,N-dipropyl acrylamide, N,N-diisopropyl acrylamide, N,N-dibutyl acrylamide, N,N-di-sec-butyl acrylamide, N,N-di-t-butyl acrylamide, N,N-dihexyl acrylamide, N,N-dicyclohexyl acrylamide, N,N-phenyl acrylamide, N,N-dihydroxyethyl acrylamide, N,N-diallyl acrylamide, N,N-dipropargyl acrylamide etc., methacrylamides such as methacrylamide and N-alkyl methacrylamide (for example, N-methyl methacrylamide, N-ethyl methacrylamide, N-propyl methacrylamide, N-isopropyl methacrylamide, morpholyl methacrylamide, piperidyl methacrylamide, N-butyl methacrylamide, N-sec-butyl methacrylamide, N-t-butyl methacrylamide, N-hexyl methacrylamide, N-cyclohexyl methacrylamide, N-phenyl methacrylamide, N-naphthyl methacrylamide, N-hydroxymethyl methacrylamide, N-hydroxyethyl methacrylamide, N-allyl methacrylamide, N-propargyl methacrylamide, 4-hydroxyphenyl methacrylamide, 2-hydroxyphenyl methacrylamide, N,N-dimethyl methacrylamide, N,N-diethyl methacrylamide, N,N-dipropyl methacrylamide, N,N-diisopropyl methacrylamide, N,N-dibutyl methacrylamide, N,N-di-sec-butyl methacrylamide, N,N-di-t-butyl methacrylamide, N,N-dihexyl methacrylamide, N,N-dicyclohexyl methacrylamide, N,N-phenyl methacrylamide, N,N-dihydroxyethyl methacrylamide, N,N-diallyl methacrylamide, N,N-dipropargyl methacrylamide etc.).

For the purpose of improving various properties such as image strength, the specific alkali water-soluble polymer of the invention can be copolymerized in a preferable embodiment not only with radical-polymerizable compounds having the above-described specific functional groups but also with other radical-polymerizable compounds unless the effect of the invention is hindered.

The radical-polymerizable compounds copolymerizable with the specific alkali water-soluble polymer in the invention include e.g. radical-polymerizable compounds selected from acrylic ester, methacrylates, acrylamides, methacrylamides, styrene and analogues thereof, acrylonitriles, and methacrylonitriles.

Specifically, the radical-polymerizable compounds include for example:

acrylic ester such as alkyl acrylate whose alkyl group preferably contains 1 o 20 carbon atoms (specifically, for example, benzyl acrylate, 4-biphenyl acrylate, butyl acrylate, sec-butyl acrylate, t-butyl acrylate, 4-t-butylphenyl acrylate, 4-chlorophenyl acrylate, pentachlorophenyl acrylate, 4-cyanobenzyl acrylate, cyanomethyl acrylate, cyclohexyl acrylate, 2-ethoxyethyl acrylate, ethyl acrylate, 2-ethylhexyl acrylate, heptyl acrylate, hexyl acrylate, isoboronyl acrylate, isopropyl acrylate, methyl acrylate, 3,5-dimethyl adamantyl acrylate, 2-naphthyl acrylate, neopentyl acrylate, octyl acrylate, phenetyl acrylate, phenyl acrylate, propyl acrylate, tolyl acrylate, amyl acrylate, tetrahydrofurfuryl acrylate, 2-hydroxyethyl acrylate, 3-hydroxypropyl acrylate, 2-hydroxypropyl acrylate, 4-hydroxybutyl acrylate, 5-hydroxypentyl acrylate, allyl acrylate, 2-aryloxyethyl acrylate, propargyl acrylate etc.), methacrylates such as alkyl methacrylate whose alkyl group preferably contains 1 to 20 carbon atoms (for example, benzyl methacrylate, 4-biphenyl methacrylate, butyl methacrylate, sec-butyl methacrylate, t-butyl methacrylate, 4-t-butylphenyl methacrylate, 4-chlorophenyl methacrylate, pentachlorophenyl methacrylate, 4-cyanophenyl methacrylate, cyanomethyl methacrylate, cyclohexyl methacrylate, 2-ethoxyethyl methacrylate, ethyl methacrylate, 2-ethylhexyl methacrylate, heptyl methacrylate, hexyl methacrylate, isoboronyl methacrylate, isopropyl methacrylate, methyl methacrylate, 3,5-dimethyl adamantyl methacrylate, 2-naphthyl methacrylate, neopentyl methacrylate, octyl methacrylate, phenetyl methacrylate, phenyl methacrylate, propyl methacrylate, tolyl methacrylate, amyl methacrylate, tetrahydrofurfuryl methacrylate, 2-hydroxyethyl methacrylate, 3-hydroxypropyl methacrylate, 2-hydroxypropyl methacrylate, 4-hydroxybutyl methacrylate, 5-hydroxypentyl methacrylate, allyl methacrylate, 2-aryloxyethyl methacrylate, propargyl methacrylate etc.), acrylamides such as acrylamide and N-alkyl acrylamide (for example, N-methyl acrylamide, N-ethyl acrylamide, N-propyl acrylamide, N-isopropyl acrylamide, morpholyl acrylamide, piperidyl acrylamide, N-butyl acrylamide, N-sec-butyl acrylamide, N-t-butyl acrylamide, N-hexyl acrylamide, N-cyclohexyl acrylamide, N-phenyl acrylamide, N-naphthyl acrylamide, N-hydroxymethyl acrylamide, N-hydroxyethyl acrylamide, N-allyl acrylamide, N-propargyl acrylamide, 4-hydroxy phenyl acrylamide, 2-hydroxy phenyl acrylamide, N,N-dimethyl acrylamide, N,N-diethyl acrylamide, N,N-dipropyl acrylamide, N,N-diisopropyl acrylamide, N,N-dibutyl acrylamide, N,N-di-sec-butyl acrylamide, N,N-di-t-butyl acrylamide, N,N-dihexyl acrylamide, N,N-dicyclohexyl acrylamide, N,N-phenyl acrylamide, N,N-dihydroxyethyl acrylamide, N,N-diallyl acrylamide, N,N-dipropargyl acrylamide etc., methacrylamides such as methacrylamide and N-alkyl methacrylamide (for example, N-methyl methacrylamide, N-ethyl methacrylamide, N-propyl methacrylamide, N-isopropyl methacrylamide, morpholyl methacrylamide, piperidyl methacrylamide, N-butyl methacrylamide, N-sec-butyl methacrylamide, N-t-butyl methacrylamide, N-hexyl methacrylamide, N-cyclohexyl methacrylamide, N-phenyl methacrylamide, N-naphthyl methacrylamide, N-hydroxymethyl methacrylamide, N-hydroxyethyl methacrylamide, N-allyl methacrylamide, N-propargyl methacrylamide, 4-hydroxyphenyl methacrylamide, 2-hydroxyphenyl methacrylamide, N,N-dimethyl methacrylamide, N,N-diethyl methacrylamide, N,N-dipropyl methacrylamide, N,N-diisopropyl methacrylamide, N,N-dibutyl methacrylamide, N,N-di-sec-butyl methacrylamide, N,N-di-t-butyl methacrylamide, N,N-dihexyl methacrylamide, N,N-dicyclohexyl methacrylamide, N,N-phenyl methacrylamide, N,N-dihydroxyethyl methacrylamide, N,N-diallyl methacrylamide, N,N-dipropargyl methacrylamide etc.), and styrene and analogues thereof such as alkyl styrene (for example, methyl styrene, dimethyl styrene, trimethyl styrene, ethyl styrene, diethyl styrene, isopropyl styrene, butyl styrene, hexyl styrene, cyclohexyl styrene, decyl styrene, benzyl styrene, chloromethyl styrene, trifluoromethyl styrene, ethoxy methyl styrene, acetoxy methyl styrene etc.), alkoxy styrene (for example, methoxy styrene, 4-methoxy-3-methyl styrene, dimethoxy styrene etc.), halogen styrene (for example, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethyl styrene, 4-fluoro-3-trifluoromethyl styrene etc.), acrylonitrile, methacrylonitrile etc.

Preferably used among these radical-polymerizable compounds are methacrylates, acrylamides, methacrylamides, and styrene and analogues thereof, and particularly preferably used are benzyl methacrylate, t-butyl methacrylate, 4-t-butylphenyl methacrylate, pentachlorophenyl methacrylate, 4-cyanophenyl methacrylate, cyclohexyl methacrylate, ethyl methacrylate, 2-ethylhexyl methacrylate, isoboronyl methacrylate, isopropyl methacrylate, methyl methacrylate, 3,5-dimethyl adamantyl methacrylate, 2-naphthyl methacrylate, neopentyl methacrylate, phenyl methacrylate, tetrahydrofurfuryl methacrylate, 2-hydroxyethyl methacrylate, 3-hydroxypropyl methacrylate, 2-hydroxypropyl methacrylate, allyl methacrylate, acrylamide, N-methyl acrylamide, N-isopropyl acrylamide, morpholyl acrylamide, piperidyl acrylamide, N-t-butyl acrylamide, N-cyclohexyl acrylamide, N-phenyl acrylamide, N-naphthyl acrylamide, N-hydroxymethyl acrylamide, N-hydroxyethyl acrylamide, N-allyl acrylamide, 4-hydroxyphenyl acrylamide, 2-hydroxyphenyl acrylamide, N,N-dimethyl acrylamide, N,N-diisopropyl acrylamide, N,N-di-t-butyl acrylamide, N,N-dicyclohexyl acrylamide, N,N-phenyl acrylamide, N,N-dihydroxyethyl acrylamide, N,N-diallyl acrylamide, methacrylamide, N-methyl methacrylamide, N-isopropyl methacrylamide, morpholyl methacrylamide, piperidyl methacrylamide, N-t-butyl methacrylamide, N-cyclohexyl methacrylamide, N-phenyl methacrylamide, N-naphthyl methacrylamide, N-hydroxymethyl methacrylamide, N-hydroxyethyl methacrylamide, N-allyl methacrylamide, 4-hydroxyphenyl methacrylamide, 2-hydroxyphenyl methacrylamide, N,N-dimethyl methacrylamide, N,N-diisopropyl methacrylamide, N,N-di-t-butyl methacrylamide, N,N-dicyclohexyl methacrylamide, N,N-phenyl methacrylamide, N, N-dihydroxyethyl methacrylamide, N,N-diallyl methacrylamide, styrene, methyl styrene, dimethyl styrene, trimethyl styrene, isopropyl styrene, butyl styrene, cyclohexyl styrene, chloromethyl styrene, trifluoromethyl styrene, ethoxymethyl styrene, acetoxymethyl styrene, methoxy styrene, 4-methoxy-3-methyl styrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethyl styrene and 4-fluoro-3-trifluoromethyl styrene.

These can be used alone or in combination thereof, and the content of these copolymerizable components is 0 to 90 mol-%, particularly preferably 0 to 60 mol-%. When the content is higher than 60 mol-%, the cured film is poor in strength.

The specific alkali water-soluble polymer according to the invention may be copolymerized with radical-polymerizable compounds having an acid group, in order to improve various performances such as an ability to remove the non-image portion. Examples of such acid groups include a carboxylic acid group, sulfonic acid group, phosphoric acid group and phenolic hydroxyl group, particularly preferably a carboxylic acid group and phenolic hydroxyl group. The radical-polymerizable compound having a carboxylic acid group includes e.g. acrylic acid, methacrylic acid, itaconic acid, crotonic acid, isocrotonic acid, maleic acid and p-carboxyl styrene, among which acrylic acid, methacrylic acid and p-carboxy styrene are particularly preferable.

The radical-polymerizable compound having a phenolic hydroxyl group includes 4-hydroxy styrene.

These can be used alone or in combination thereof, and the content of these copolymerizable components is preferably 0 to 50 mol-%, particularly preferably 0 to 40 mol-% from the viewpoint of preventing the strength of an image from being damaged by development with an aqueous alkaline solution. When the content is higher than 40 mol-%, the strength of an image is easily damaged by development with an aqueous alkaline solution.

The solvent used for synthesis of such polymer compounds includes e.g. ethylene dichloride, cyclohexanone, methyl ethyl ketone, acetone, methanol, ethanol, propanol, butanol, ethylene glycol monomethyl ether, ethylene glycol monoethyl ether, 2-methoxy ethyl acetate, 1-methoxy-2-propanol, 1-methoxy-2-propyl acetate, N,N-dimethyl formamide, N,N-dimethyl acetamide, dimethyl sulfoxide, toluene, ethyl acetate, methyl lactate and ethyl lactate.

These solvents may be used alone or as a mixture thereof.

The weight average molecular weight of the polymer compound used in the image recording material of the present invention is preferably 6,000 or more, more preferably in the range of 50,000 to 200,000. If the molecular weight is lower than 6,000, the glass transition temperature is lowered, and the image intensity becomes insufficient, resulting in an undesired state. If the molecular weight is higher than 200,000, the development performance is lowered.

Further, the specific alkali water-soluble polymer according to the invention may also contain unreacted monomers. In this case, the ratio of the monomers to the polymer compound is desirably 15% by weight or less.

The polymer compound according to the invention may be used alone or in combination thereof. In this case, the amount of other polymer compounds not included in (A) specific alkali water-soluble polymer according to the invention is 80% by weight or less, more preferably 50% by weight or less in the polymer compound.

The solids content of (A) specific alkali-soluble polymer in the image recording material of the invention is about 5 to 95% by weight, preferably about 10 to 85% by weight. When the content is lower than 5% by weight, the image portion where an image has been formed is poor in strength. On the other hand, when the content is higher than 95% by weight, no image is formed.

(B) Light-Heat Converting Agent

The image recording material of the invention is used in recording by light exposure in heat mode, typically by a laser emitting infrared rays, so use of a light-heat converting agent is essential. The light-heat converting agent has the function of absorbing a light at a predetermined wavelength to convert it into heat. By the heat thus generated, component (C) described later, that is, a compound forming radicals upon heat-mode exposure to light at a wavelength that can be absorbed by (B) light-heat exchanging agent is decomposed to generate radicals.

The light-heat converting agent used in the invention can be used without particular limitation to the absorption wavelength range insofar as the light-heat converting agent generates heat upon absorption of light energy irradiation used in recording. From the viewpoint of compatibility thereof with an easily available high-energy laser, the light-heat converting agent used in the invention is particularly preferably an infrared ray-absorbing dye or pigment having the absorption maximum in wavelengths between 760 to 1200 nm.

The dye may be any one of commercial dyes including known dyes described in e.g. "*Senryo Binran*" (Dye Handbook) (published in 1970 and compiled by Society of Synthetic Organic Chemistry, Japan). Examples of such dyes include azo dyes, metal complex salt azo dyes, pyrazolone azo dyes, naphthoquinone dyes, anthraquinone dyes, phthalocyanine dyes, carbonium dyes, quinone imine dyes, methine dyes, cyanine dyes, squarylium dyes, pyrylium salts, metal thiolate complexes, oxonol dyes, diimonium dyes, aminium dyes and croconium dyes.

Preferable dyes include e.g. the cyanine dyes described in JP-A Nos. 58-125246, 59-84356, 59-202829, 60-78787 etc., the methine dyes described in JP-A Nos. 58-173696, 58-181690, 58-194595 etc., the naphthoquinone dyes described in JP-A Nos. 58-112793, 58-224793, 59-48187, 59-73996, 60-52940, 60-63744 etc., the squarylium dyes described in JP-A No. 58-112792 etc., and the cyanine dyes described in GB Patent No. 434,875.

Further, the near infrared ray-absorbing sensitizer described in U.S. Pat. No. 5,156,938 is also preferably used, and also preferably used are the substituted aryl benzo (thio) pyrylium salts described in U.S. Pat. No. 3,881,924, the trimethine thiapyrylium salts described in JP-A No. 57-142645 (U.S. Pat. No. 4,327,169), the pyrylium type compounds described in JP-A Nos. 58-181051, 58-220143, 59-41363, 59-84248, 59-84249, 59-146063, and 59-146061, the cyanine dye described in JP-A No. 59-216146, the pentamethine thiopyrylium salts described in U.S. Pat. No. 4,283,475, and the pyrylium compounds described in Japanese Patent Application Publication (JP-B) Nos. 5-13514 and 5-19702.

Other preferable examples of dyes include the near infrared ray-absorbing dyes of formulae (I) and (II) described in U.S. Pat. No. 4,756,993.

Particularly preferable among these dyes are cyanine pigments, phthalocyanine dyes, oxonol dyes, squarylium dyes, pyrylium salts, thiopyrylium dyes and nickel thiolate complexes. Further, the dyes represented by the general formulae (a) to (e) below are preferable because of high light-heat conversion efficiency, among which the cyanine dyes represented by the general formula (a) below is most preferable because when used in the polymerizable composition of the invention, the cyanine dye gives a high polymerization activity and is economical and excellent in stability.

General formula (a)

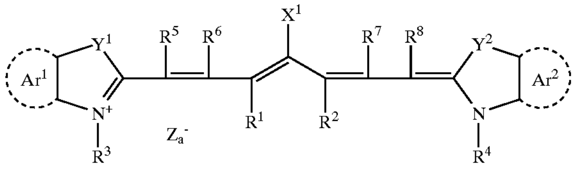

In the general formula (a), $X^1$ represents a hydrogen atom, halogen atom, —$NPh_2$, $X^2$-$L^1$ or the group shown below. $x^2$ represents an oxygen atom or sulfur atom, $L^1$ represents a $C_{1-12}$ hydrocarbon, an aromatic ring having a heteroatom, and a $C_{1-12}$ hydrocarbon group containing a heteroatom. The heteroatom refers to N, S, O, halogen atom or Se.

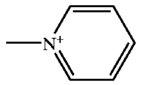

$R^1$ and $R^2$ independently represent a $C_{1-12}$ hydrocarbon group. For the storage stability of the recording layer coating solution, each of $R^1$ and $R^2$ is preferably a hydrocarbon group containing 2 or more carbon atoms, and more preferably $R^1$ and $R^2$ are bound to each other to form a 5- or 6-membered ring.

$Ar^1$ and $Ar^2$ may be the same or different, and represent an aromatic hydrocarbon group which may have a substituent group. The aromatic hydrocarbon group is preferably a benzene ring or naphthalene ring. The substituent group is preferably a hydrocarbon group containing 12 or less carbon atoms, or a halogen atom, or an alkoxy group containing 12 or less carbon atoms. $Y^1$ and $Y^2$ may be the same or different, and represent a sulfur atom or a dialkyl methylene group containing 12 or less carbon atoms. $R^3$ and $R^4$ may be the same or different, and represent a hydrocarbon group containing 20 or less carbon atoms, which may have a substituent group. The substituent group is preferably an alkoxy group containing 12 or less carbon atoms, or a carboxyl group or a sulfo group. $R^5$, $R^6$, $R^7$ and $R^8$ may be the same or different, and represent a hydrogen atom or a hydrocarbon group containing 12 or less carbon atoms. Each of $R^5$, $R^6$, $R^7$ and $R^8$ is preferably a hydrogen atom because the starting material is easily available. $Za^-$ represents a counter anion. When any one of $R^1$ to $R^8$ is substituted with a sulfo group, $Za^-$ is not necessary. Because of the storage stability of the recording layer coating solution, $Za^-$ is preferably a halogen ion, perchlorate ion, tetrafluoroborate ion, hexafluorophosphate ion and sulfonate ion, particularly preferably a perchlorate ion, hexafluorophosphate ion and aryl sulfonate ion.

Examples of the cyanine dyes represented by the general formula (a), which can be preferably used in the invention, include those described in columns [0017] to [0019] in Japanese Patent Application No. 11-310623, columns [0012] to [0038] in Japanese Patent Application No. 2000-224031, and columns [0012] to [0023] in Japanese Patent Application No. 2000-211147, in addition to those exemplified below.

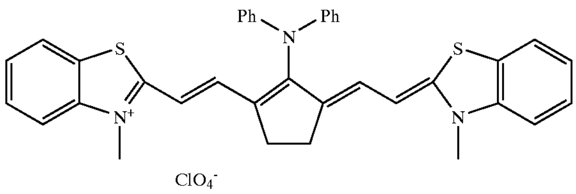

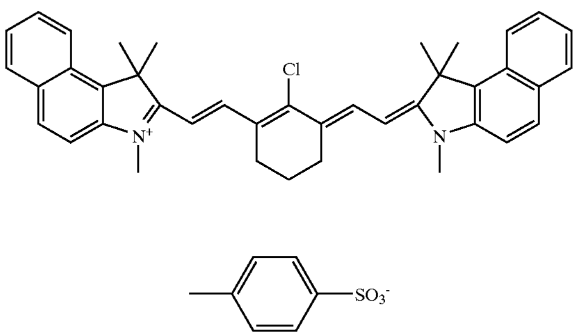

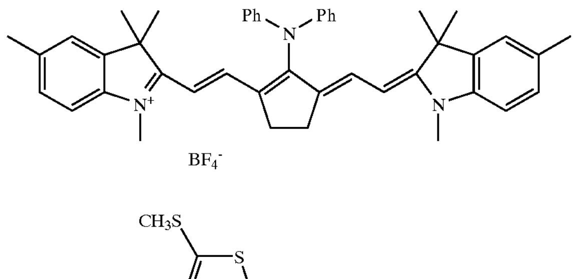

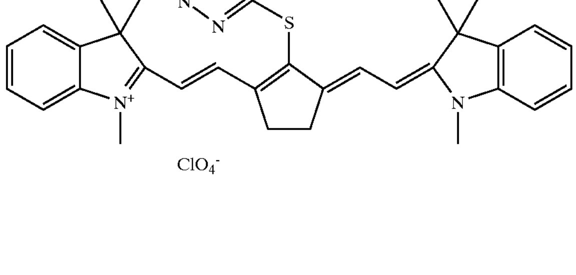

-continued

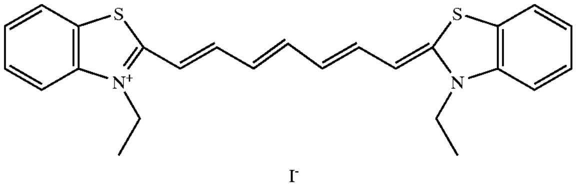

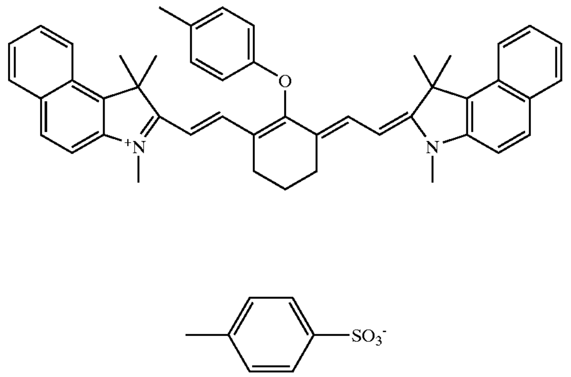

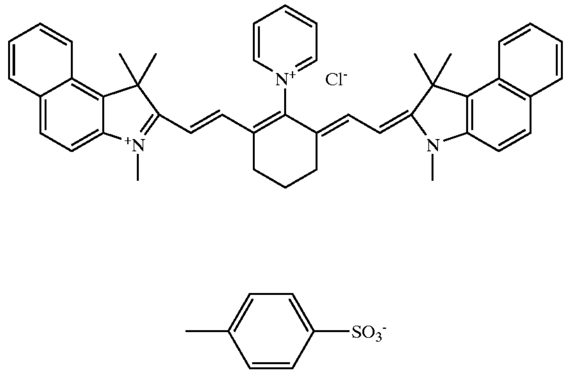

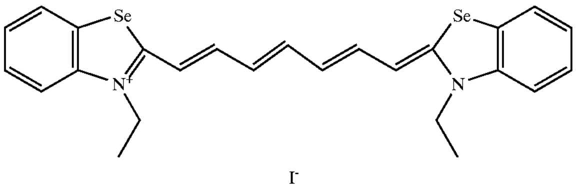

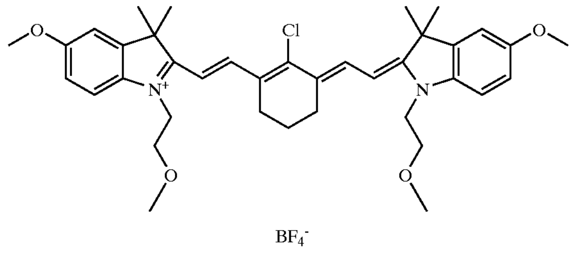

-continued

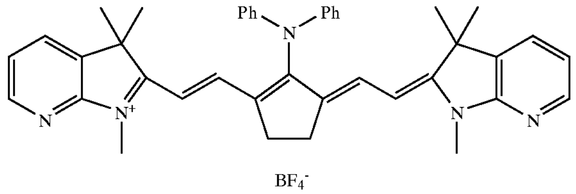

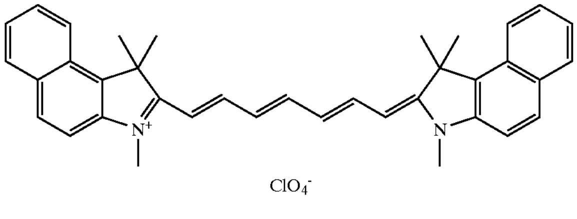

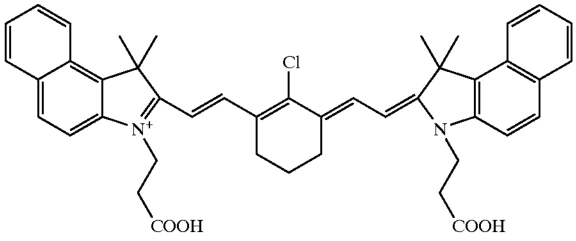

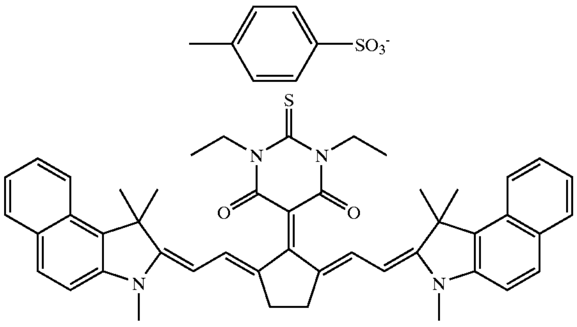

General formula (b)

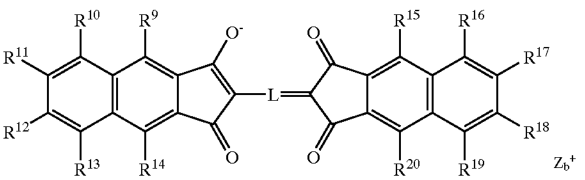

In the general formula (b), L represents a methine chain containing 7 or more conjugated carbon atoms, and the methine chain may have substituent groups, and the substituent groups may be bound to each other to form a ring structure. $Zb^+$ represents a counter cation. The counter cation is preferably ammonium, iodonium, sulfonium, phosphonium, pyridinium and alkali metal cations ($Na^+$, $K^+$, $Li^+$). $R^9$ to $R^{14}$ and $R^{15}$ to $R^{20}$ independently represent a substituent group selected from a hydrogen atom, halogen atom, cyano group, alkyl group, aryl group, alkenyl group, alkynyl group, carbonyl group, thio group, sulfonyl group, sulfinyl group, oxy group and amino group, or a substituent group in which two or three substituent groups are combined with one another to form a ring structure. The compound of the general formula (b) in which L represents a methine chain containing 7 conjugated carbon atoms or all $R^9$ to $R^{14}$ and $R^{15}$ to $R^{20}$ represent a hydrogen atom, are preferable from the viewpoint of easy availability and effect.

Examples of the dyes represented by the general formula (b), which can be used preferably in the invention, include those exemplified below:

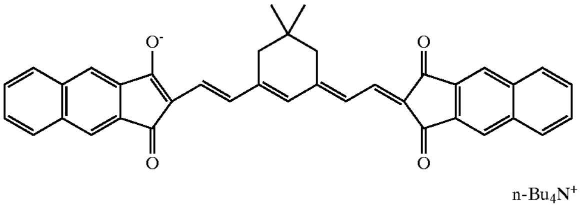

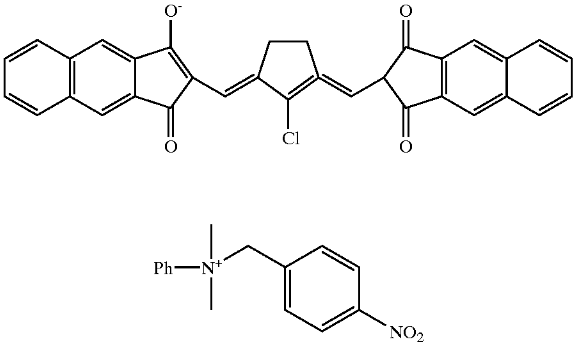

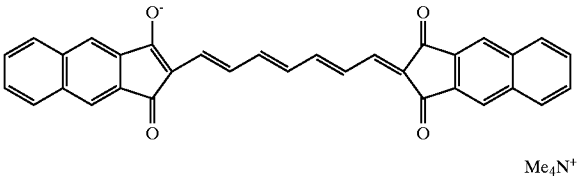

General formula (c)

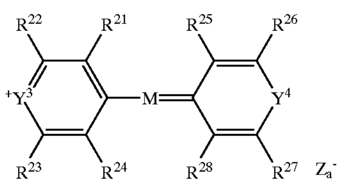

In the general formula (c), $Y^3$ and $Y^4$ each represent an oxygen atom, sulfur atom, selenium atom or tellurium atom; M represents a methine chain containing 5 or more conjugated carbon atoms; $R^{21}$ to $R^{24}$ and $R^{25}$ to $R^{28}$ may be the same or different and represent a hydrogen atom, halogen atom, cyano group, alkyl group, aryl group, alkenyl group, alkynyl group, carbonyl group, thio group, sulfonyl group, sulfinyl group, oxy group and amino group; and $Za^-$ represents a counter anion and has the same meaning as defined above for $Za^-$ in the general formula (a).

Examples of the dyes represented by the general formula (c), which can be used preferably in the invention, include those exemplified below:

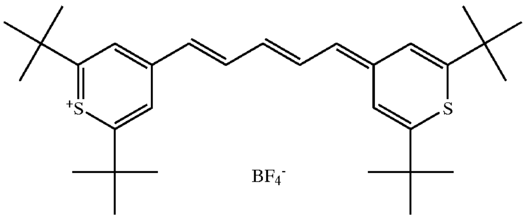

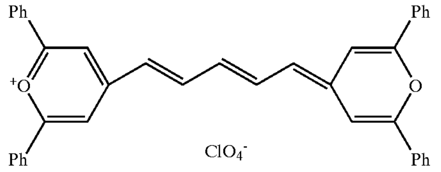

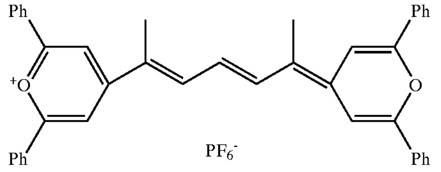

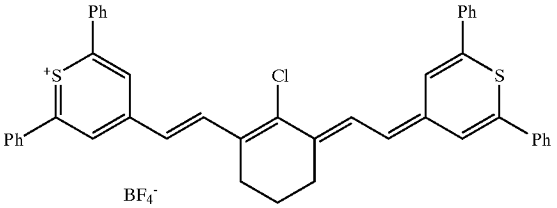

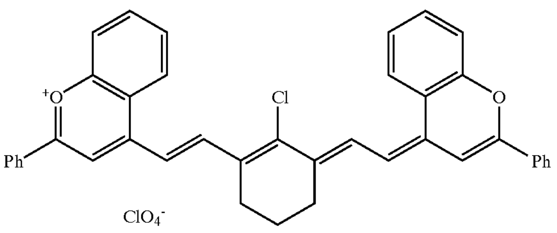

General formula (d)

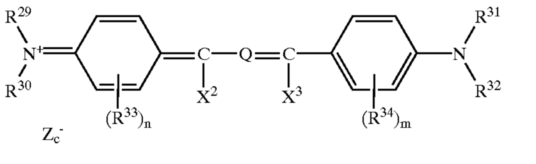

In the general formula (d), $R^{29}$ to $R^{31}$ independently represent a hydrogen atom, alkyl group or aryl group; $R^{33}$ and $R^{34}$ independently represent an alkyl group, a substituted oxy group or a halogen atom; n and m independently represent an integer of 0 to 4; $R^{29}$ and $R^{30}$, or $R^{31}$ and $R^{32}$, may be bound to each other to form a ring, or $R^{29}$ and/or $R^{30}$ may be bound to $R^{33}$, or $R^{31}$ and/or $R^{32}$ may be bound to $R^{34}$, to form a ring, and when a plurality of $R^{33}$ or $R^{34}$ groups are present, $R^{33}$ groups or $R^{34}$ groups may be mutually bound to form a ring; $X^2$ and $X^3$ independently represent a hydrogen atom, an alkyl group or an aryl group, and at least one of $X^2$ and $X^3$ represents a hydrogen atom or an alkyl group; Q is an optionally substituted trimethine group or pentamethine group which may form a ring structure with a divalent organic group; and $Zc^-$ represents a counter anion and has the same meaning as defined above for $Za^-$ in the general formula (a).

Examples of the dyes represented by the general formula (d), which can be used preferably in the invention, include those exemplified below:

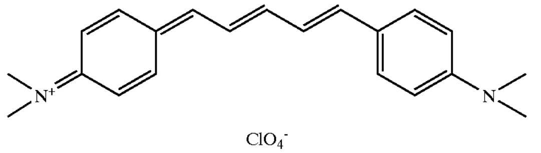

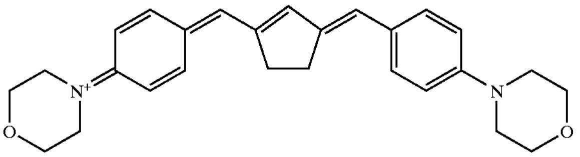

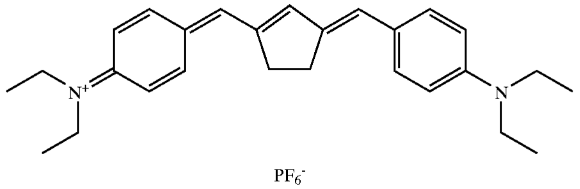

General formula (e)

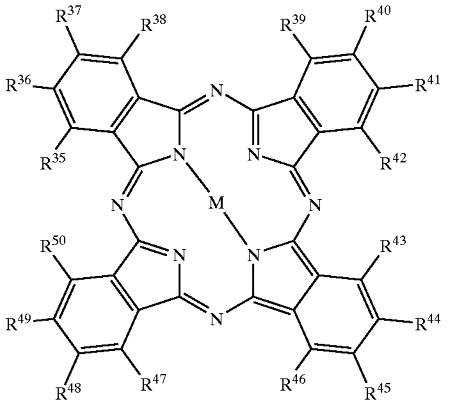

In the general formula (e), $R^{35}$ to $R^{50}$ independently represent a hydrogen atom, halogen atom, cyano group, alkyl group, aryl group, alkenyl group, alkynyl group, hydroxyl group, carbonyl group, thio group, sulfonyl group, sulfinyl group, oxy group, amino group, and onium salt structure, all of which may have a substituent group; and M represents two hydrogen atoms or a metal atom, halometal group and oxymetal group, and the metal atom contained therein includes the groups IA, IIA, IIIB and IVB atoms in the periodic table, the transition metals in the first, second and third periods, and lanthanoid elements, among which copper, magnesium, iron, zinc, cobalt, aluminum, titanium and vanadium are preferable.

Examples of the dyes represented by the general formula (e), which can be used preferably in the invention, include those exemplified below:

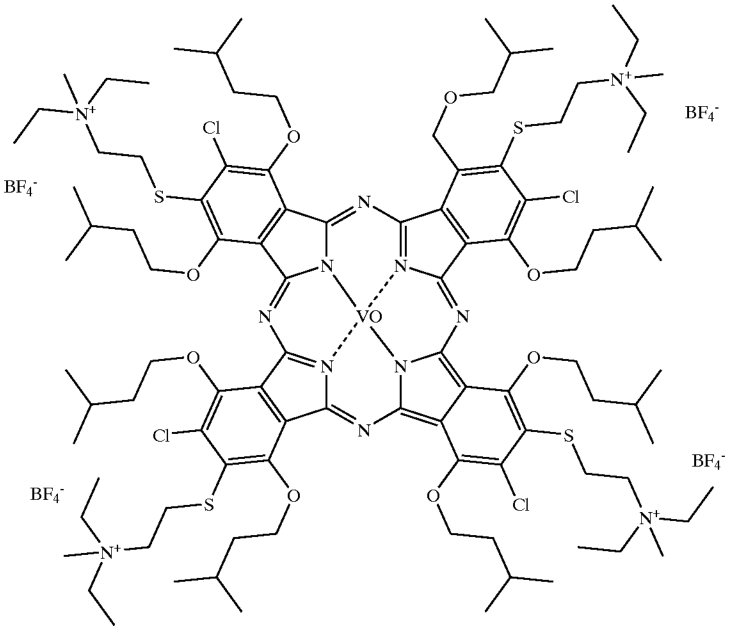

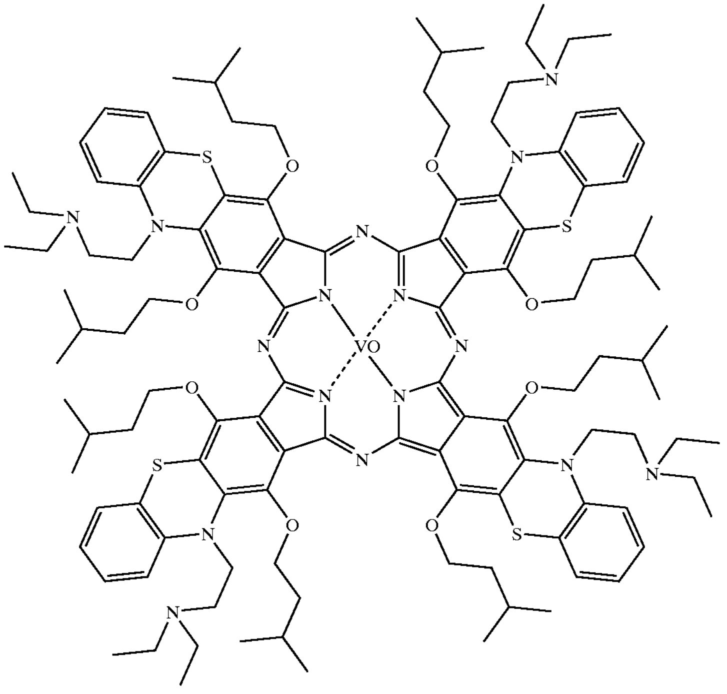

The pigment usable preferably as the light-heat converting agent in the invention includes commercial pigments and those described in Color Index (C. I.) Handbook, "Saishin Ganryo Binran" (Newest Pigment Handbook) (published in 1977 and compiled by Japanese Society of Pigment Technology), "Saishin Ganryho Oyo Gijyutsu" (Newest Pigment Applied Technology) (published in 1986 by CMC), and "Insatsu Inki Gijyutsu" (Printing Ink Technology) (published in 1984 by CMC).

As the type of pigment, mention is made of black pigments, yellow pigments, orange pigments, brown pigments, red pigments, violet pigments, blue pigments, green pigments, fluorescent pigments, metallic powder pigments, and other pigments such as polymer-binding pigments. Specifically, it is possible to use insoluble azo pigments, azo lake pigments, condensed azo pigments, chelate azo pigments, phthalocyanine type pigments, anthraquinone type pigments, perylene and perinone type pigments, thioindigo type pigments, quinacridone type pigments, dioxazine type pigments, isoindolinone type pigments, quinophthalone type pigments, dyed lake pigments, azine pigments, nitroso pigments, nitro pigments, natural pigments, fluorescent pigments, inorganic pigments, carbon black etc. A preferable pigment among those described above is carbon black.

For use, these pigments may or not may be subjected to surface treatment. The method of surface treatment includes a method of coating the surface thereof with resin or wax, a method of allowing a surfactant to adhere thereto, and a method of bonding a reactive material (e.g., a silane coupling agent, an epoxy compound, a polyisocyanate etc.) onto the surface of the pigment. These methods of surface treatment are described in "Kinzoku Sekken No Seishitsu To Oyo" (Properties and Application of Metallic Soap) (Saiwai Shobo), "Insatsu Inki Gijyutsu" (Printing Ink Technology) (published in 1984 by CMC) and "Saishin Ganryho Oyo Gijyutsu" (Newest Pigment Applied Technology) (published in 1986 by CMC).

The particle diameters of the pigments are in the range of preferably 0.01 to 10 μm, more preferably 0.05 to 1 μm and particularly preferably 0.1 to 1 μm. Their particle diameters of less than 0.01 μm are not preferable in respect of the stability of their dispersion in the image recording layer coating solution, whereas their particle diameters of more than 10 μm are not preferable either in respect of the uniformity of the image recording layer.

As the method of dispersing the pigments, any known dispersion techniques used in production of inks or toners can be used. As the dispersing machine, mention is made of a supersonic dispersing device, sand mill, attritor, pearl mill, super mill, ball mill, impeller, disperser, KD mill, colloid mill, dynatron, triple roll mill, press kneader etc. These are described in detail in "*Saishin Ganryho Oyo Gijyutsu*" (Newest Pigment Applied Technology) (published in 1986 by CMC).

In the invention, these light-heat converting agents may be used singly or in combination thereof, but from the viewpoint of sensitivity, the light-heat converting agent is preferably the pigment shown in the general formula (a), most preferably the cyanine pigment having a diaryl amino group.

The light-heat converting agent is added preferably in an amount of 0.1 to 20% by weight based on the total solids content of the heat-sensitive composition. If the amount of the light-heat converting agent is lower than this range, the sensitivity of characteristic change by light exposure tends to be lowered thus failing to achieve sufficient photosensitivity, while if its amount is higher than this range, the uniformity and strength of the resultant film tend to be lowered, so both the cases are not preferable.

The light-heat converting agent, along with other components, may be added to the same layer or to a separately provided layer such that in the resultant negative image forming material, the optical density of the recording layer at the absorption maximum at a wavelength in the range of 760 to 1200 nm is preferably in the range of 0.1 to 3.0. If the optical density is outside of this range, the sensitivity tends to be lowered. Because the optical density is determined by both the amount of the light-heat converting agent added and the thickness of the recording layer, the predetermined optical density can be achieved by regulating conditions for the two factors. The optical density of the recording layer can be measured in a usual manner. In this measurement, there is a method in which a recording layer which after drying, has suitably determined thickness in a range necessary as a planographic printing plate is formed on e.g. a transparent or white support and then measured by a transmission optical densitometer, or the recording layer is formed on a reflective support such as aluminum and then measured for its reflective density.

(C) Radical Initiator

The compound generating radicals with heat-mode light exposure (radical initiator) is used in combination with (B) light-heat converting agent described above, and refers to a compound generating radicals by the energy of light and/or heat upon irradiation with light (from e.g. an infrared laser) at a wavelength that can be absorbed by the light-heat converting agent, thus initiating and promoting polymerization of (A) polymer compound which is soluble in an aqueous alkaline solution, has at least one carbon—carbon double bond in a side chain thereof and has a glass transition temperature of 100° C. or more and (D) optionally used radical-polymerizable compound having a polymerizable unsaturated group described later. The "heat-mode light exposure" follows the definition described above in the invention.

The radical initiator used can be selected from known photopolymerization initiators and heat polymerization initiators, and examples thereof include onium salts, triazine compounds having a trihalomethyl group, peroxides, azo-type polymerization initiators, azide compounds and quinone diazide, among which the onium salts are highly sensitive and preferable.

The radical-generating compound that can be used preferably in the invention includes onium salts, which are specifically iodonium salts, diazonium salts or sulfonium salts. The onium salt functions not as an acid generator but also as a radical polymerization initiator when used in combination with a radical-polymerizable compound described later. The onium salts used preferably in the invention are those onium salts represented by the general formulae (III) to (V):

General formula (III)

$$Ar^{11}—I^{+}—Ar^{12}\ \ Z^{11-}$$

General formula (IV)

$$Ar^{21}—N^{+}\equiv N\ \ Z^{21-}$$

General formula (V)

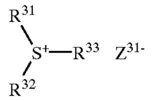

In the formula (III), $Ar^{11}$ and $Ar^{12}$ independently represent an aryl group containing 20 or less carbon atoms, which may have a substituent group. When this aryl group has a substituent group, the substituent group is preferably a halogen atom, a nitro group, an alkyl group containing 12 or less carbon atoms, an alkoxy group containing 12 or less carbon atoms, or an aryloxy group containing 12 or less carbon atoms. $Za^{11-}$ represents a counterion selected from the group consisting of a halogen ion, perchlorate ion, carboxylate ion, tetrafluoroborate ion, hexafluorophosphate ion and sulfonate ion, preferably a perchlorate ion, hexafluorophosphate ion and aryl sulfonate ion.

In formula (IV), $Ar^{21}$ represents an aryl group containing 20 or less carbon atoms, which may have a substituent group. The substituent is preferably a halogen atom, a nitro group, an alkyl group containing 12 or less carbon atoms, an alkoxy group containing 12 or less carbon atoms, an aryloxy group containing 12 or less carbon atoms, an alkylamino group containing 12 or less carbon atoms, a dialkyl amino group containing 12 or less carbon atoms, an aryl amino group containing 12 or less carbon atoms, or a diaryl amino group containing 12 or less carbon atoms. $Z^{21-}$ represents a counterion having the same meaning as defined for $Z^{11-}$.

In formula (V), $R^{31}$, $R^{32}$ and $R^{33}$ may be the same or different, and represent a hydrocarbon group containing 20 or less carbon atoms, which may have a substituent group. The substituent is preferably a halogen atom, a nitro group, an alkyl group containing 12 or less carbon atoms, an alkoxy group containing 12 or less carbon atoms or an aryloxy group containing 12 or less carbon atoms. $z^{31}$ represents a counterion having the same meaning as defined for $Z^{11-}$.

Examples of the onium salts that can be used preferably in the invention include the applicant's proposed ones described in columns [0030] to [0033] in Japanese Patent Application No 11-310623 and those in columns [0015] to [0046] in Japanese Patent Application No. 2000-160323.

The onium salt used in the invention has a maximum absorption wavelength of preferably 400 nm or less, more preferably 360 nm or less. By using the onium salt having its absorption wavelength in the UV range, the planographic printing plate precursor can be handled under an incandescent lamp.

These onium salts can be added to the recording layer coating solution in a ratio of 0.1 to 50% by weight, preferably 0.5 to 30% by weight, particularly preferably 1 to 20% by weight to the solids content of the recording layer coating solution. If the amount of the salts is less than 0.1% by weight, the sensitivity is lowered, while if the amount is greater than 50% by weight, smuts occur on the non-image portion during printing. These onium salts may be used alone or in combination thereof. Further, these onium salts together with other components may be added to the same layer or another layer that is separately arranged.

(D) Radical-Polymerizable Compound

In the image recording material of the invention, a radical-polymerizable compound can be used in combination in order to improve sensitivity and image formability. The radical-polymerizable compound that can be used in combination is a radical-polymerizable compound having at least one ethylenically unsaturated double bond, and is selected from those compounds having at least one (preferably two or more) terminal ethylenically unsaturated bond. Such a compound group is used widely in this industrial field, and in the invention, these compounds can be used without any particular limitation. These compounds are in chemical forms such as monomers, prepolymers, that is, dimers, trimers and oligomers, as well as mixtures and copolymers thereof.

Examples of such monomers and copolymers include unsaturated carboxylic acids (e.g., acrylic acid, methacrylic acid, itaconic acid, crotonic acid, isocrotonic acid, maleic acid etc.) and esters and amides thereof, and preferably used are esters between unsaturated carboxylic acids and aliphatic polyvalent alcohols and amides between unsaturated carboxylic acids and aliphatic polyvalent amines. Further, dehydration condensation reaction products of unsaturated carboxylates or amides having nucleophilic substituent groups such as hydroxyl group, amino group, mercapto group and so on, with monofunctional or multifunctional isocyanates or epoxy compound can be preferably used. Further, addition-reaction products of unsaturated carboxylates or amides having nucleophilic substituent groups such as hydroxyl group, amino group, mercapto group and so on, with monofunctional or multifunctional carboxylic acids can be preferably used.

Further, addition-reaction products of unsaturated carboxylates or amides having electrophilic substituent groups such as isocyanate group, epoxy group and so on, with monofunctional or multifunctional alcohols, amines or thiols can be preferably used. Further, substitution-reaction products of unsaturated carboxylates or amides having eliminating substituent groups such as halogen group, tosyloxy group and so on, with monofunctional or multifunctional alcohols, amines or thiols can be preferably used. Further, a group of those compounds in which the above-described carboxylic acids have been respectively replaced by unsaturated phosphonic acids, styrene and so on, can also be preferably used.

Among the radical-polymerizable compounds as esters between aliphatic polyvalent alcohols and unsaturated carboxylic acids, the acrylates include ethylene glycol diacrylate, triethylene glycol diacrylate, 1,3-butane diol diacrylate, tetramethylene glycol diacrylate, propylene glycol diacrylate, neopentyl glycol diacrylate, trimethylol propane triacrylate, trimethylol propane tri(acryloyloxy propyl) ether, trimethylol ethane triacrylate, hexane diol diacrylate, 1,4-cyclohexane diol diacrylate, tetraethylene glycol diacrylate, pentaerythritol diacrylate, pentaerythritol triacrylate, pentaerythritol tetracrylate, dipentaerythritol diacrylate, dipentaerythritol hexacrylate, sorbitol triacrylate, sorbitol tetracrylate, sorbitol pentacrylate, sorbitol hexacrylate, tri (acryloyloxy ethyl) isocyanurate, polyester acrylate oligomers etc.

The methacrylates include tetramethylene glycol dimethacrylate, triethylene glycol dimethacrylate, neopentyl glycol dimethacrylate, trimethylol propane trimethacrylate, trimethylol ethane trimethacrylate, ethylene glycol dimethacrylate, 1,3-butane diol dimethacrylate, hexane diol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropyl) phenyl] dimethyl methane, bis[p-(methacryloxy ethoxy) phenyl] dimethyl methane etc.

The itaconates include ethylene glycol diitaconate, propylene glycol diitaconate, 1,3-butane diol diitaconate, 1,4-butane diol diitaconate, tetramethylene glycol diitaconate, pentaerythritol diitaconate, sorbitol tetraitaconate etc.

The crotonates include ethylene glycol dicrotonate, tetramethylene glycol dicrotonate, pentaerythritol dicrotonate, sorbitol tetracrotonate etc.

The isocrotonates include ethylene glycol diisocrotonate, pentaerythritol diisocrotonate, sorbitol tetraisocrotonate etc.

The maleates include ethylene glycol dimaleate, triethylene glycol dimaleate, pentaerythritol dimaleate, sorbitol tetramaleate etc.

Other esters, which can also be preferably used, include e.g. the aliphatic alcohol-based esters described in JP-B Nos. 46-27926 and 51-47334 and JP-A No. 57-196231, those having an aromatic skeleton described in JP-A Nos. 59-5240, 59-5241 and 2-226149, and those having an amino group described in JP-A No. 1-165613.

As the monomers, the amides between aliphatic polyvalent amines and unsaturated carboxylic acids include e.g. methylene bis-acrylamide, methylene bis-methacrylamide, 1,6-hexamethylene bis-acrylamide, 1,6-hexamethylene bis-methacrylamide, diethylene triamine trisacrylamide, xylylene bisacrylamide, xylylene bismethacrylamide etc.

Preferable examples of other amide type monomers include those having a cyclohexylene structure described in JP-B No. 54-21726.

Further, urethane type addition-polymerizable compounds produced by addition reaction between isocyanates and hydroxyl groups are also preferable, and specific examples thereof include vinyl urethane compounds containing two or more polymerizable vinyl groups in one molecule, which are prepared by adding vinyl monomers containing a hydroxyl group shown in formula (VI) below to polyisocyanates compound having two or more isocyanate groups in one molecule as described in JP-B No. 48-41708.

$$CH_2{=}C(R^{34})COOCH_2CH(R^{35})OH \quad (VI)$$

In the formula (IV), $R^{34}$ and $R^{35}$ independently represent a hydrogen atom or a methyl group.

Further, the urethane acrylates described in JP-A No. 51-37193, JP-B Nos. 2-32293 and 2-16765, and the urethane compounds having an ethylene oxide-type skeleton described in JP-B Nos. 58-49860, 56-17654, 62-39417 and 62-39418 are also preferable.

Also, the radical-polymerizable compounds having an amino structure or sulfide structure in the molecule as described in JP-A Nos. 63-277653, 63-260909 and 1-105238 may be used.

As other examples, the multifunctional acrylates and methacrylates such as polyacrylates and epoxy acrylates obtained by reacting epoxy resin with (meth)acrylic acid described in JP-A No. 48-64183, JP-B Nos. 49-43191 and 52-30490 can be mentioned. Further, the specific unsaturated compounds described in JP-B Nos. 46-43946, 1-40337 and 1-40336, and the vinyl phosphonic acid-type compounds described in JP-A No. 2-25493 can also be mentioned. In some cases, the structure containing a perfluoroalkyl group described in JP-A No. 61-22048 is preferably used. Further, the photo-curable monomers and oligomers described in the Journal of Japanese Adhesive Society, vol. 20, No. 7, pp. 300–308 (1984) can also be used.

The radical-polymerizable compounds may be used singly or in combination thereof. How these radical-polymerizable compounds are used, that is, what structure is used, whether they are used singly or in combination, and in which amount they are used, can be arbitrarily determined depending on the performance and design of the final recording material.

A higher compounding ratio of the radical-polymerizable compound in the image recording material is advantageous to sensitivity, but when the ratio is too high, there arise occurrence of undesirable phase separation, a problem such as adhesion of the image recording layer in the production process (for example, production failure attributable to the transfer and adhesion of the components in the recording layer) and a problem such as precipitation from the developing solution. From these viewpoints, the compounding ratio of the radical-polymerizable compound in many cases is preferably 5 to 80% by weight, preferably 20 to 75% by weight, in the components in the composition.

In the invention, when the specific alkali-soluble polymer (A) is used in combination with the radical-polymerizable compound (D), the component (A):component (D) ratio by weight is in the range of 1:0.05 to 1:3, preferably in the range of 1:0.1 to 1:2, more preferably in the range of 1:0.3 to 1:1.5.

From the viewpoints of the inhibition of polymerization by oxygen, resolution, hiding power, a change in reflectance, surface adhesiveness etc., a suitable structure, compounding and amount thereof can be arbitrarily selected in the method of using the radical-polymerizable compound, and further a layer structure and a coating method such as undercoating and overcoating can also be carried out if necessary.

Other Components

In the image recording material of the invention, various compounds other than those described above can be further added if necessary. For example, a dye having considerable absorption in the visible-light range can be used as a coloring agent for images. Specifically, mention can be made of Oil Yellow #101, Oil Yellow #103, Oil Pink #312, Oil Green BC, Oil Blue BOS, Oil Blue #603, Oil Black BY, Oil Black BS, Oil Black T-505 (which are available from Orient Chemical Industries, Ltd.), Victoria Pure Blue, Crystal Violet (CI42555), Methyl Violet (CI42535), Ethyl Violet, Rhodamine B (CI145170B), Malachite Green (CI42000), Methylene Blue (CI52015) etc. Further, the dyes described in JP-A No. 62-293247 are particularly preferable. Further, pigments such as phthalocyanine type pigments, azo type pigments, carbon black and titanium oxide can also be preferably used.

These dyes are preferably added to facilitate distinction of the image portion from the non-image portion. The amount of the dye is 0.01 to 10% by weight based on the total solids content of the recording layer coating solution.

In the invention, a small amount of a heat-polymerizable inhibitor is desirably added to inhibit undesired heat polymerization of the radical polymerizable compound in the image recording material during preparation or storage. Examples of suitable heat-polymerization inhibitors include hydroquinone, p-methoxyphenol, di-t-butyl-p-cresol, pyrogallol, t-butyl catechol, benzoquinone, 4,4'-thiobis (3-methyl-6-t-butyl phenol), 2,2'-methylene bis(4-methyl-6-t-butyl phenol), N-nitroso-N-phenyl hydroxylamine aluminum salt etc. The amount of the heat-polymerization inhibitor added is preferably about 0.01 to about 5% by weight relative to the total weight of the composition. To prevent the inhibition of polymerization by oxygen, a higher fatty acid derivative such as behenic acid or behenic amide may be added if necessary so that it is allowed to be locally present on the surface of the recording layer in the drying step after application. The amount of the higher fatty acid derivative added is preferably about 0.1 to about 10% by weight relative to the entire composition.

The image forming material in the invention is used for forming an image recording layer mainly in a planographic printing plate precursor, and for improving the stability of the image recording layer to development treatment under development conditions, nonionic surfactants such as those described in JP-A Nos. 62-251740 and 3-208514 and amphoteric surfactants such as those described in JP-A Nos. 59-121044 and 4-13149 can be added.

Specific examples of the nonionic surfactants include sorbitan tristearate, sorbitan monopalmitate, sorbitan trioleate, stearate monoglyceride, polyoxyethylene nonyl phenyl ether etc.

Specific examples of the amphoteric surfactants include alkyl di (aminoethyl) glycine, alkyl polyaminoethyl glycine hydrochloride, 2-alkyl-N-carboxyethyl-N-hydroxyethyl imidazolium betaine and N-tetradecyl-N,N-betaine type surfactants (e.g. trade name: Amogen K, Dai-Ichi Kogyo Co., Ltd.).

The amount of the nonionic surfactants and amphoteric surfactants in the recording layer coating solution is preferably 0.05 to 15% by weight, more preferably 0.1 to 5% by weight.

Further, a plasticizer is added if necessary to the recording layer coating solution in order to confer e.g. flexibility on the coating. For example, polyethylene glycol, tributyl citrate, diethyl phthalate, dibutyl phthalate, dihexyl phthalate, dioctyl phthalate, tricresyl phosphate, tributyl phosphate, trioctyl phosphate and tetrahydrofurfuryl oleate are used.

When the image forming material of the invention is used to produce a planographic printing plate precursor, the constituent components of the image forming material, together with components necessary for the coating solution, are dissolved in a solvent and then applied onto a suitable substrate. The solvent used here includes, but is not limited to, ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethyl acetamide, N,N-dimethyl formamide, tetramethyl urea, N-methyl pyrrolidone, dimethyl sulfoxide, sulfolane, γ-butyl lactone, toluene, water etc. These solvents are used singly or as a mixture thereof. The concentration of the above components (total solids content including additives) in the solvent is preferably 1 to 50% by weight.

The amount of the recording layer (solids content) coated and dried on the substrate is varied depending on the intended use, but generally, the amount thereof for the planographic printing plate precursor is preferably 0.5 to 5.0 $g/m^2$. As its coating is decreased, the apparent sensitivity is improved, but the film characteristics of the image recording layer are lowered.

For coating, various methods can be used, and for example, bar coating, rotational coating, spray coating, curtain coating, dip coating, air knife coating, blade coating and roll coating can be mentioned.

Surfactants for improving coating properties, for example the fluorine type surfactants described in JP-A No. 62-170950, can be added to the recording layer coating solution in the invention. The amount of the surfactant added is preferably 0.01 to 1% by weight, more preferably 0.05 to 0.5% by weight, relative to the solids content of the entire recording layer.

In this manner, with respect to the softening temperature of an image recording layer formed on a support member, that is, a photosensitive layer, it is preferably set to not less than 60° C. If the temperature is below 60° C., the storage stability is lowered. In the case when a low-molecular component, such as a radical polymerizable compound, exists as a photosensitive layer composition, the softening temperature of the photosensitive layer drops; however, the application of a binder having a glass transition temperature of not less than 80° C. is effective so as to maintain the softening temperature at not less than 60° C. Here, the softening temperature of the photosensitive layer is measured by using a differential scanning calorimeter (DSC) or a visco-elasticity measuring meter.

The image recording material of the invention is used mainly as a recording layer in a planographic printing plate precursor. The planographic printing plate precursor has at least a substrate, a recording layer and if necessary a protective layer. The substrate and protective layer as the constituent elements of the planographic printing plate precursor are described below.

Substrate

The substrate used in forming a planographic printing plate precursor from the image forming material of the invention is not particularly limited insofar as it is a dimensionally stable plate, and examples thereof include a paper, a paper with plastics (e.g., polyethylene, polypropylene, polystyrene etc.) laminated thereon, a metal plate (e.g., aluminum, zinc, copper etc.), plastic film (e.g., diacetate cellulose, triacetate cellulose, propionate cellulose, butyrate cellulose, acetate butyrate cellulose, nitrate cellulose, polyethylene terephthalate, polyethylene, polystyrene, polypropylene, polycarbonate, polyvinyl acetal etc.), etc. These may be single-component sheets such as resinous film and metal plate, or laminates consisting of two or more materials laminated therein, such as a paper or plastic film having the above-described metal laminated or vapor-deposited thereon or a laminate sheet consisting of different plastic films, etc.

The substrate is preferably a polyester film or an aluminum plate, among which the aluminum plate is excellent in dimensional stability and relatively inexpensive and is thus particularly preferable. The aluminum plate is preferably a pure aluminum plate or an alloy plate based on aluminum containing a trace of different elements, and may be a plastic film having aluminum laminated or vapor-deposited thereon. The different elements contained in the aluminum alloy include silicon, iron, manganese, copper, magnesium, chromium, zinc, bismuth, nickel, titanium etc. The content of the different elements in the alloy is up to 10% by weight. Particularly preferable aluminum in the invention is pure aluminum, but because production of absolutely pure aluminum is difficult in refining techniques, aluminum may contain a trace of different elements. The composition of the aluminum plate thus used in the invention is not limited, and any aluminum plates made of a known and conventionally used aluminum material can be used if necessary.

The thickness of the aluminum plate is about 0.1 to 0.6 mm, preferably 0.15 to 0.4 mm and most preferably 0.2 to 0.3 mm.

Before the surface of the aluminum plate is roughened, degreasing treatment with e.g. a surfactant, an organic solvent or an aqueous alkali solution is conducted if necessary for removal of rolling oil on the surface thereof.

The treatment of roughening the surface of the aluminum plate is conducted in various methods such as a method of mechanical surface roughening, a method of surface roughening by electrochemical dissolution of the surface and a method of chemically and selectively dissolving the surface. The mechanical method can make use of known techniques such as ball grinding, brush grinding, blast grinding and buff grinding. The electrochemical roughening method includes a method of roughening the surface in a hydrochloric acid or nitric acid electrolyte by use of alternating current or direct current. Further, a combination of both the methods can also be utilized as disclosed in JP-A No. 54-63902.

After the aluminum plate thus surface-roughened is subjected if necessary to alkali etching treatment and neutralization treatment, the plate can be subjected to anodizing treatment in order to improve the water retention and abrasion resistance of the surface. The electrolyte for use in the anodizing treatment of the aluminum plate can be selected from various electrolytes for forming a porous oxide film, and generally sulfuric acid, phosphoric acid, oxalic acid, chromic acid or a mixed acid thereof is used. The concentration of the electrolyte is determined suitably depending on the type of the electrolyte.

The conditions for the anodizing treatment are varied depending on the electrolyte used and can thus not be generalized, but it is usually preferable that the concentration of the electrolyte is 1 to 80% by weight, the liquid temperature is 5 to 70° C., the current density is 5 to 60 $A/dm^2$, the voltage is 1 to 100 V, and the electrolysis time is 10 seconds to 5 minutes.

The amount of the anodized film is preferably not less 1.0 $g/m^2$, more preferably in the range of 2.0 to 6.0 $g/m^2$. If the anodized film is less than 1.0 $g/m^2$, the printing resistance becomes insufficient and the non-image portion on the planographic printing plate is easily marred to have the so-called "mar staining" which is caused by ink adhering to the mar upon printing.

The printing surface of the substrate in the planographic printing plate is subjected to such anodizing treatment, but because of the line of electric force sent to the back thereof, 0.01 to 3 $g/m^2$ anodized film is generally formed on the back as well.

The treatment for rendering the surface of the substrate hydrophilic, which is conducted after the anodizing treatment described above, can make use of a treatment method known in the art. Such hydrophilicity-conferring treatment includes the alkali metal silicate (e.g., an aqueous solution of sodium silicate) method disclosed in U.S. Pat. Nos. 2,714,066, 3,181,461, 3,280,734 and 3,902,734. In this method, the substrate is dipped or electrolyzed in an aqueous solution of sodium silicate. Besides, the method of treatment with potassium fluorozirconate as disclosed in JP-B No. 36-22063 and the method of treatment with polyvinyl phosphonic acid as disclosed in U.S. Pat. Nos. 3,276,868, 4,153,461, and 4,689,272 are used.

Among these treatments, particularly preferable hydrophilicity-conferring treatment in the invention is the treatment with silicates. The treatment with silicates is described below.

The anodized film on the aluminum plate which was subjected to the treatment described above is dipped for example at 15 to 80° C. for 0.5 to 120 seconds in an aqueous solution of an alkali metal silicate at a concentration of 0.1 to 30% by weight, preferably 0.5 to 10% by weight, at a pH 10 to 13 at 25° C. If the pH value of the aqueous alkali metal silicate solution is 10 or less, the solution is gelled, while if the pH value is higher than 13.0, the anodized film is dissolved. As the alkali metal silicate used in the invention, sodium silicate, potassium silicate, lithium silicate etc. are used. The hydroxide used for raising the pH value of the aqueous alkali metal silicate solution includes sodium hydroxide, potassium hydroxide, lithium hydroxide etc. Alkaline earth metal salts or the group IVB metal salts may be incorporated into the treating solution described above. The alkaline earth metals include nitrates such as calcium nitrate, strontium nitrate, magnesium nitrate and barium nitrate, and water-soluble salts such as nitrate, hydrochloride, phosphate, acetate, oxalate and borate. The group IVB metal salts include titanium tetrachloride, titanium trichloride, titanium potassium fluoride, titanium potassium oxalate, titanium sulfate, titanium tetraiodide, zirconium chloride oxide, zirconium dioxide, zirconium oxychloride, zirconium tetrachloride etc. The alkaline earth metal salts or the group IVB metal salts can be used singly or in combination thereof. The amount of these metal salts is preferably in the range of 0.01 to 10% by weight, more preferably 0.05 to 5.0% by weight.

Because the hydrophilicity of the surface of the aluminum plate is further improved by silicate treatment, the ink hardly adheres to the non-image portion during printing, and the stain resistance is improved.

The substrate is provided if necessary with a back coat on the back thereof. The back coat is preferably a coating layer consisting of metal oxides obtained by hydrolysis and polycondensation of the organic polymer compounds described in JP-A No. 5-45885 and the organic or inorganic metal compounds described in JP-A No. 6-35174.

Among these coating layers, coating layers of metal oxides obtained from alkoxy silicon compounds such as $Si(OCH_3)_4$, $Si(OC_2H_5)_4$, $Si(OC_3H_7)_4$ and $Si(OC_4H_9)_4$ are particularly preferable because these layers are excellent in development resistance and these starting materials are available easily and inexpensively.

Protective Layer

When used in a planographic printing plate precursor, the image recording material of the invention is exposed to light usually in the air, so preferably the image recording layer containing the photo-polymerizable composition is provided thereon with a protective layer, in which the desired characteristics of the protective layer are low permeability of low-molecular compounds such as oxygen, good permeability of light used in light exposure, excellent adhesion to the recording layer, and high removability in the development step after light exposure, and the materials used in the protective layer are preferably water-soluble polymer compounds relatively excellent in crystallinity, such as polyvinyl alcohol, polyvinyl pyrrolidone, acidic celluloses, gelatin, gum arabic and polyacrylic acid.

In the image recording material of the invention, the specific polyurethane resin having low oxygen dissolved in its coating and a high ability to shield the image recording layer against oxygen in the outside is used as the film-forming resin, thus advantageously preventing the deterioration of image formability caused by the inhibition of polymerization by oxygen, so the protective layer may not necessarily be arranged, but for the purpose of further improving the ability to shield it against oxygen in the outside thus improving image formability particularly image strength, the protective layer may be arranged.

Printing by the Planographic Printing Plate Precursor

A planographic printing plate precursor prepared by using the imager-recording material of the invention as the recording layer can be used in recording by an infrared laser Further, thermal recording by a UV lamp or thermal head is also feasible. In the invention, the image thereon is exposed to light preferably by a solid laser and a semiconductor laser emitting infrared rays of wavelengths of from 760 nm to 1200 nm.

After exposed to light by the infrared laser, the image forming material of the invention is developed preferably with water or an aqueous alkaline solution.

When the aqueous alkaline solution is used as a developing solution, the developing solution and its supplementary solution for the image recording material of the invention may be an aqueous alkali solution known in the art. For example, mention is made of inorganic alkali salts such as sodium silicate, potassium silicate, tribasic sodium phosphate, tribasic potassium phosphate, tribasic ammonium phosphate, dibasic sodium phosphate, dibasic potassium phosphate, dibasic ammonium phosphate, sodium carbonate, potassium carbonate, ammonium carbonate, sodium hydrogen carbonate, potassium hydrogen carbonate, ammonium hydrogen carbonate, sodium borate, potassium borate, ammonium borate, sodium hydroxide, ammonium hydroxide, potassium hydroxide and lithium hydroxide. Further, use is made of organic alkali agents such as monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethylene imine, ethylene diamine, and pyridine.

These alkali agents are used singly or in combination thereof.

It is also known that when the development is conducted in an automatic developer, an aqueous solution of higher alkali strength (supplementary solution) than in the developing solution is added to the developing solution, whereby a large number of planographic printing plate precursors can be treated without exchanging the developing solution with the fresh one for a prolonged period of time in the development tank. This supplementing system can also be preferably applied to the invention.

For promoting and suppressing developing performance, for dispersing development residues and for improving the affinity of the image portion on the printing plate for ink, various surfactants and organic solvents can be added if necessary to the developing solution and the supplementary solution. Preferable surfactants include anionic, cationic, nonionic and amphoteric surfactants. A preferable organic solvent is benzyl alcohol. Addition of polyethylene glycol or derivatives thereof or polypropylene glycol or derivatives thereof is also preferable. Further, non-reducing sugars such as arabitol, sorbitol and mannitol can also be added.

Reducing agents such as hydroquinone, resorcin, or inorganic salts such as sodium and potassium sulfite or hydrogensulfite, organic carboxylic acids, defoaming agents and hard-water softeners, can also be added if necessary to the developing solution and the supplementary solution.

The printing plate which was subjected to development treatment with the developing solution and the supplementary solution described above is post-treated with washing water, a surfactant-containing rinse, and an insensitizing greasing solution containing gum arabic and starch derivatives. When the image recording material of the invention is used as a printing plate material, these treatments can be used in combination as post-treatment.

In the industrial fields of plate making and printing, an automatic developing machine for printing plate is used widely in recent years for rationalization and standardization for the operation of plate making. This automatic developing machine consists generally of a developing part, a post-treatment part, a device for transferring a printing plate, each treating solution bath and a spraying device, and while a printing plate after light exposure is transferred horizontally, each treating solution drawn by a pump is sprayed for development onto the printing plate through a spray nozzle. Recently, a method of dipping-treating a printing plate in a treating solution bath filled with a treating solution while transferring it by use of guide rolls in the solution is also known. Such automatic treatment can be carried out by supplementing each treatment solution with a supplementary solution, depending on throughput, operation time etc. Further, the supplementary solution can be automatically fed while the electrical conductance is sensed with a sensor.

The so-called "throwaway" treatment system of treatment with a substantially virgin treating solution can also be applied.

The planographic printing plate thus obtained is coated with an insensitizing greasing gum if necessary and then subjected to printing, but if the planographic printing plate with higher printing resistance is desired, it is subjected to burning treatment.

When the planographic printing plate is subjected to burning, the plate before burning is treated preferably with those surface-adjusting solutions described in JP-B Nos. 61-2518, 55-28062, JP-A Nos. 62-31859 and 61-159655.

For this treatment, use is made of a method of applying a sponge or adsorbent cotton impregnated with the surface-adjusting solution onto the planographic printing plate, or dipping the printing plate in a vat filled with the surface-adjusting solution, or coating by an automatic coater. Further, better results are given by applying the surface-adjusting solution uniformly by an squeezer or with squeeze rollers.

Generally, the amount of the surface-adjusting solution applied is preferably 0.03 to 0.8 g/m$^2$ (dry weight).

The planographic printing plate coated with the surface-adjusting solution is dried if necessary and then heated at high temperatures by a burning processor (e.g. a burning processor BP-1300 from Fuji Photo Film Co., Ltd.). In this case, the heating temperature and time are varied depending the type of components forming the image, but are preferably 180 to 300° C. and 1 to 20 minutes.

After burning treatment, the planographic printing plate can be subjected to conventional treatments such as washing with water and gumming drawing if necessary, but if a surface-adjusting solution containing water-soluble polymers etc. is used, the so-called insensitizing greasing treatment such as gumming drawing can be omitted.

The planographic printing plate obtained from the image recording material of the invention is loaded onto an offset printing machine etc. and used for printing on multiple papers.

EXAMPLES

Hereinafter, the present invention is described by reference to Synthesis Examples, Examples and Comparative Examples, which however are not intended to limit the invention.

Synthesis Examples

Synthesis Example 1

Specific Alkali-Soluble Polymer Compound 1

60 ml of N,N-dimethylacetamide was placed in a 500-ml three-necked flask equipped with a condenser and a stirrer, and then heated at 70° C. 60 ml solution of 50 g of 4-carboxyl styrene and 2.49 g of V-65 (Wako Pure Chemical Industries, Ltd.) in N,N-dimethyl acetamide was added dropwise over 2.5 hours in a nitrogen stream. Further, the mixture was reacted at 70° C. for 2 hours. The reaction mixture was diluted with 120 ml of N,N-dimethylacetamide and cooled to room temperature, and 34 g of triethylamine was added dropwise via a dropping funnel to the reaction mixture under stirring. After this addition was finished, 47 g of 3-bromopropyl methacrylate was added dropwise via a dropping funnel to the reaction solution under stirring, and the mixture was reacted for 8 hours.

After the reaction mixture was cooled to 0° C., 5 M HCl was added dropwise thereto under stirring until the pH value of the reaction mixture was reduced to 6 or less. The reaction solution was poured into 5 L of water to precipitate a polymer. This product was collected by filtration, washed with water and dried to give a polymer compound 1.

By its NMR spectrum, it was confirmed that 70% of the carboxyl groups of the polymer had been converted into 3-methacryloyloxy propyl ester. The glass transition temperature as determined by DSC was 105° C., and the weight average molecular weight as determined by gel permeation chromatography (GPC) using polystyrene as the standard was 90, 000.

Synthesis Example 2

Specific Alkali-Soluble Polymer Compound 2

150 ml of N,N-dimethylacetamide was placed in a 1000-ml three-necked flask equipped with a condenser and a stirrer, and then heated at 70° C. 150 ml solution of 74 g of 4-carboxy styrene, 52 g of styrene and 2.46 g of V-65 (Wako Pure Chemical Industries, Ltd.) in N,N-dimethyl acetamide was added dropwise over 2.5 hours in a nitrogen stream. Further, the mixture was reacted at 70° C. for 2 hours. The reaction mixture was diluted with 150 ml of N,N-dimethylacetamide and cooled to room temperature, and 52 g of triethylamine was added dropwise via a dropping funnel to the reaction mixture under stirring. After this addition was finished, 60 g of 3-bromopropyl methacrylate was added dropwise via a dropping funnel to the reaction solution under stirring, and the mixture was reacted for 8 hours.

After the reaction mixture was cooled to 0° C., 5 M HCl was added dropwise thereto under stirring until the pH value of the reaction mixture was reduced to 6 or less. The reaction solution was poured into 5 L of water to precipitate a polymer. This product was collected by filtration, washed with water and dried to give a polymer compound 2.

By its NMR spectrum, it was confirmed that 30% of the carboxyl groups of the polymer had been converted into 3-methacryloyloxy propyl ester. The glass transition temperature as determined by DSC was 110° C., and the weight average molecular weight as determined by gel permeation chromatography (GPC) using polystyrene as the standard was 110,000.

Synthesis Example 3

Specific Alkali-Soluble Polymer Compound 3

100 g of poly-p-hydroxystyrene having a weight average molecular weight of 40,000 was dissolved in 500 ml of N,N-dimethylacetamide in a 1000-ml three-necked flask equipped with a condenser and a stirrer. 42 g of triethylamine was added dropwise via a dropping funnel to the solution at room temperature under stirring. After this addition was finished, 83 g of 3-bromopropyl methacrylate was added dropwise via a dropping funnel to the reaction solution under stirring, and the mixture was reacted for 8 hours.

After the reaction mixture was cooled to 0° C., 5 M HCl was added dropwise thereto under stirring until the pH value of the reaction mixture was reduced to 6 or less. The reaction solution was poured into 5 L of water to precipitate a polymer. This product was collected by filtration, washed with water and dried to give a polymer compound 3.

By its NMR spectrum, it was confirmed that 50% of the carboxyl groups of the polymer had been converted into 3-methacryloyloxy propyl ether. The glass transition temperature as determined by DSC was 112° C., and the weight average molecular weight as determined by gel permeation chromatography (GPC) using polystyrene as the standard was 50,000.

The specific alkali-soluble polymer compounds (polymer compounds 1 to 23) were synthesized in the same manner as in Synthesis Examples 1 to 3 except that the respective monomers shown in Tables 1 to 3 were used. Further, Tables 1 to 3 show the measurement results of the glass transition temperature (Tg in the tables) of each polymer compound as determined by DSC and the molecular weight thereof by GPC.

TABLE 1

| No. | Compositional ratio (mol-%) | Tg(° C.) | WAMW* |
|---|---|---|---|
| 1 | 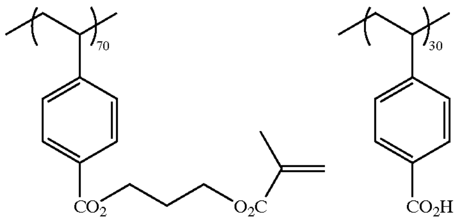 | 105 | 90000 |
| 2 | 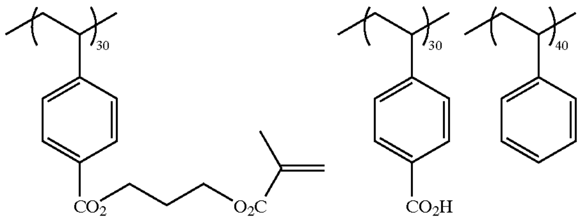 | 110 | 110000 |
| 3 | 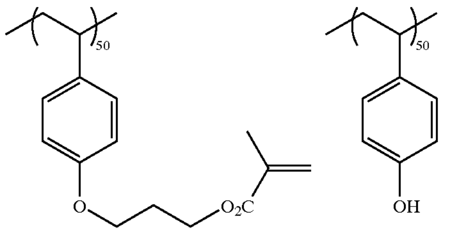 | 112 | 50000 |
| 4 | 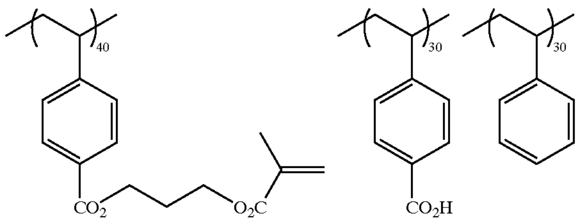 | 108 | 89000 |

TABLE 1-continued
| No. | Compositional ratio (mol-%) | Tg(° C.) | WAMW* |
|---|---|---|---|
| 5 | 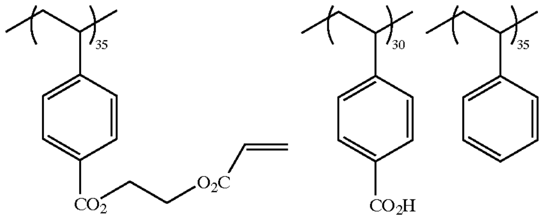 | 110 | 95000 |
| 6 | 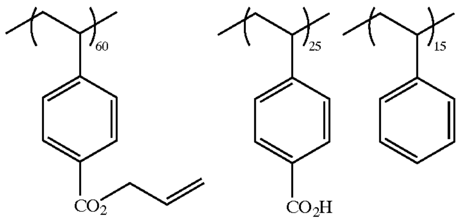 | 110 | 88000 |
| 7 | 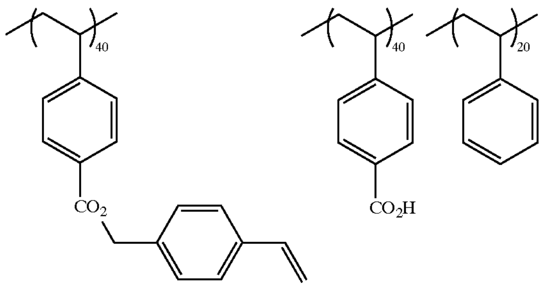 | 114 | 101000 |
| 8 | 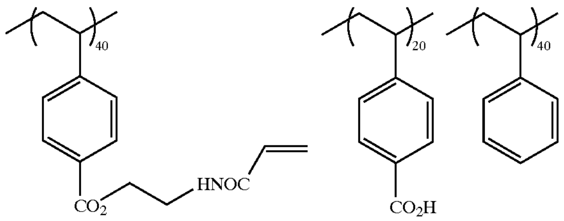 | 112 | 92000 |
WAMW*: Weight average molecular weight
TABLE 2
| No. | Compositional ratio (mol-%) | Tg(° C.) | WAMW* |
|---|---|---|---|
| 9 | 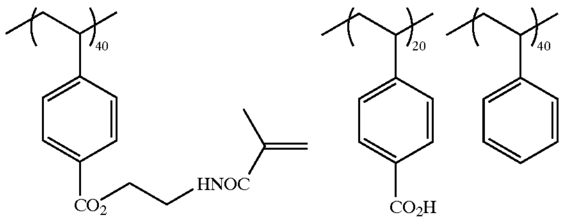 | 115 | 95000 |

TABLE 2-continued
| No. | Compositional ratio (mol-%) | Tg(° C.) | WAMW* |
|---|---|---|---|
| 10 | 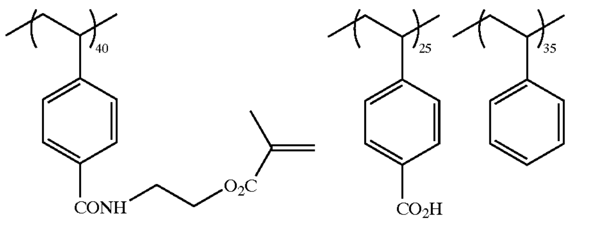 | 113 | 105000 |
| 11 | 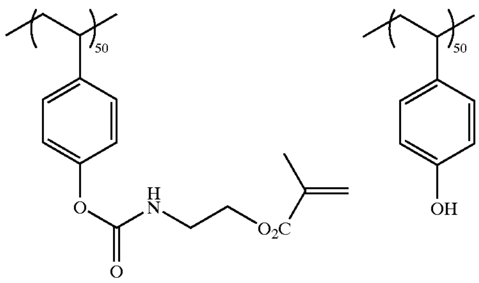 | 123 | 55000 |
| 12 | 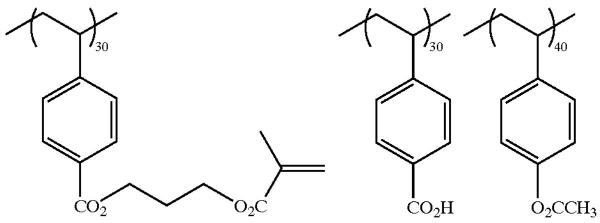 | 110 | 99000 |
| 13 | 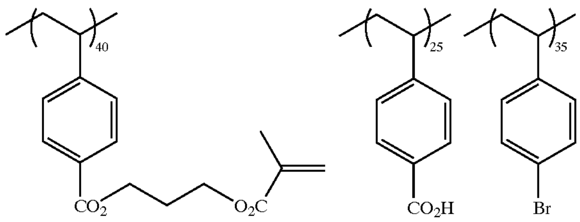 | 118 | 120000 |
| 14 | 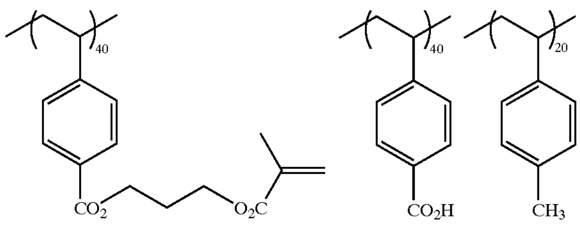 | 112 | 114000 |
| 15 | 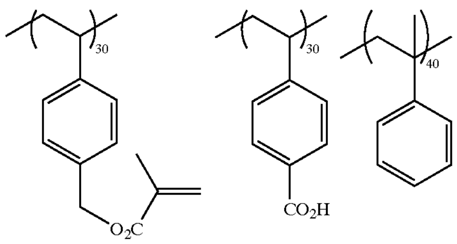 | 121 | 103000 |

TABLE 2-continued
| No. | Compositional ratio (mol-%) | Tg(° C.) | WAMW* |
|---|---|---|---|
| 16 | 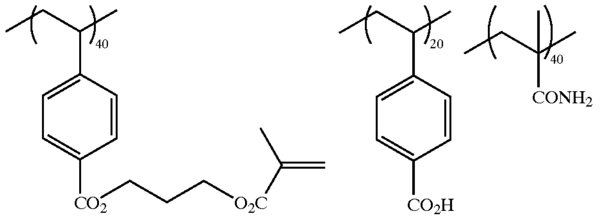 | 125 | 121000 |
WAMW*: Weight average molecular weight
TABLE 3
| No. | Compositional ratio (mol-%) | Tg(° C.) | WAMW* |
|---|---|---|---|
| 17 | 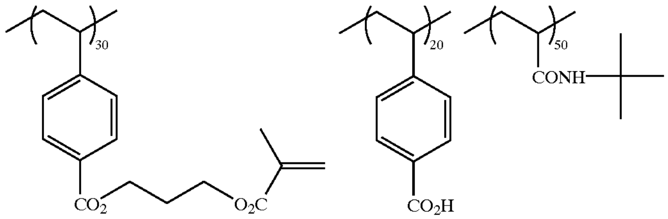 | 116 | 99000 |
| 18 | 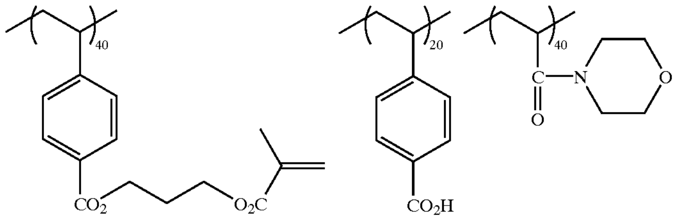 | 118 | 103000 |
| 19 | 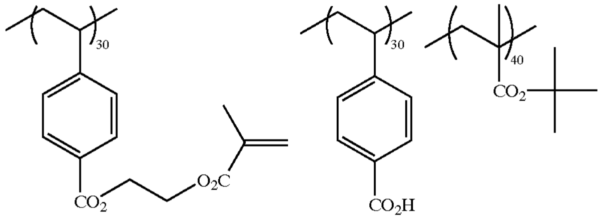 | 120 | 100000 |
| 20 | 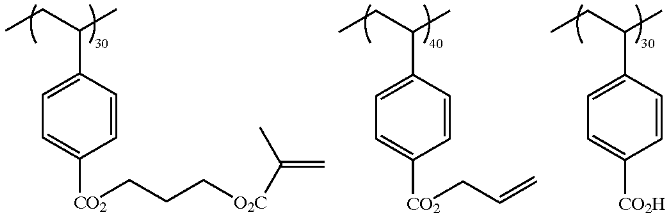 | 108 | 114000 |
| 21 | 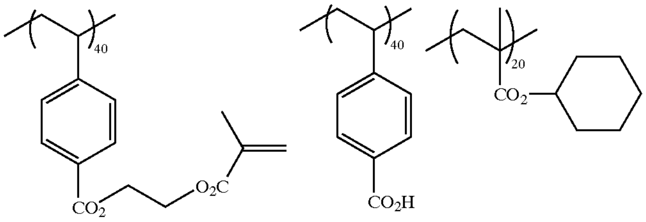 | 110 | 121000 |

TABLE 3-continued

| No. | Compositional ratio (mol-%) | Tg(° C.) | WAMW* |
|---|---|---|---|
| 22 | 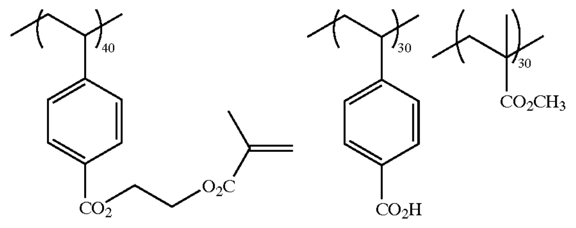 | 114 | 111000 |
| 23 | 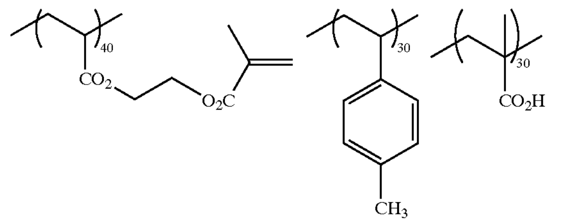 | 110 | 105000 |

WAMW*: Weight average molecular weight

Examples 1 to 4 and Comparative Example 1

Preparation of a Substrate

An alloy melt containing 99.5% or more aluminum, 0.30% Fe, 0.10% Si, 0.02% Ti, and 0.013% Cu was subjected to cleaning treatment and then cast. In this cleaning treatment, the melt was degassed to remove unnecessary gas such as hydrogen, and filtered through a ceramic tube filter. Casting was conducted using a DC casting method. After 10-mm surface layer was removed from the coagulated ingot plate of 500 mm in thickness, the plate was subjected to homogenization treatment at 550° C. for 10 hours such that intermetallic compounds were not agglomerated. Then, the plate was hot-rolled at 400° C., then annealed at 500° C. for 60 seconds in a continuous annealing furnace and cold-rolled to form an aluminum rolled plate of 0.30 mm in thickness. By regulating the roughness of pressure rollers, the central line average surface roughness Ra after cold rolling was regulated to be 0.2 μm. Thereafter, the plate was placed in a tension leveler to improve flatness.

Then, the plate was subjected to surface treatment to form a substrate for planographic printing plate.

First, the surface of the aluminum plate was defatted at 50° C. for 30 seconds in 10% aqueous sodium aluminate to remove the rolling oil therefrom and then neutralized with 30% aqueous sulfuric acid at 50° C. for 30 seconds, to remove smuts therefrom.

Then, the surface of the substrate was roughened (i.e. grained) thereby facilitating the adhesion of the substrate to a recording layer while conferring water retention characteristics on the non-image part. The substrate was subjected to electrolytic graining by floating the aluminum web in an aqueous solution containing 1% nitric acid and 0.5% aluminum nitrate at 45° C. and electrifying it at 240 $C/dm^2$ at the side of the anode at a current density of 20 $A/dm^2$ in an alternating waveform in the duty ratio of 1:1 from an indirect feeder cell. Thereafter, the substrate was etched at 50° C. for 30 seconds in 10% aqueous sodium aluminate and then neutralized with 30% aqueous sulfuric acid at 50° C. for 30 seconds to remove smuts therefrom.

Further, the substrate was anodized to form an oxide film thereon, in order to improve abrasion resistance, chemical resistance and water retention characteristics. The substrate was subjected to electrolysis in 20% aqueous sulfuric acid as the electrolyte at 35° C. at a direct current of 14 $A/dm^2$ from an indirect feeder cell while floating the aluminum web in the electrolyte, to form a 2.5 g of/$m^2$ anodized film thereon.

Thereafter, the surface of the substrate was rendered hydrophilic by treating it with a silicate, in order to secure hydrophilicity on the non-image part in the planographic printing plate. This treatment was conducted by passing 1.5% aqueous sodium silicate No. 3 at 70° C. such that the contact time thereof with the aluminum web was 15 seconds, and then the substrate was washed with water. The amount of Si adhering thereto was 10 $mg/m^2$. The Ra (central line surface roughness) of the substrate thus prepared was 0.25 μm.

Formation of a Recording Layer

The recording layer coating solution (P-1) below was prepared, applied via a wire bar onto the aluminum substrate obtained in the manner described above, and dried at 115° C. for 45 seconds in a hot-air oven to form a recording layer to give a planographic printing plate precursor. The amount of the coating after drying was in the range of 1.2 to 1.3 g of/$m^2$.

The alkali-soluble polymers used in the Examples are the specific alkali-soluble polymers obtained in the Synthesis Examples described above, and the structural unit of the alkali-soluble polymer B-1 used in Comparative Example 1 is shown later. DPHA used as the radical-polymerizable compound is dipentaerythritol hexaacrylate.

Recording Layer Coating Solution (P-1)

Alkali-soluble polymer: Component (A) (compound shown in Table 4, in the amount shown in Table 4)

| | |
|---|---|
| Radical-polymerizable compound: | |
| Component (D) (compound shown in Table 4, in the amount shown in Table 4) | |
| IR absorber "IR-1": Component (B) | 0.08 g |
| Polymerization initiator "S-1": Component (C) | 0.30 g |
| Victoria Pure Blue naphthalene sulfonate | 0.04 g |
| Fluorine-type surfactant | 0.01 g |
| (trade name: Megafack F-176, from Dainippon Ink and Chemicals, Incorporated) | |
| p-Methoxyphenol | 0.001 g |
| Methyl ethyl ketone | 9.0 g |
| Methanol | 10.0 g |
| 1-Methoxy-2-propanol | 8.0 g |

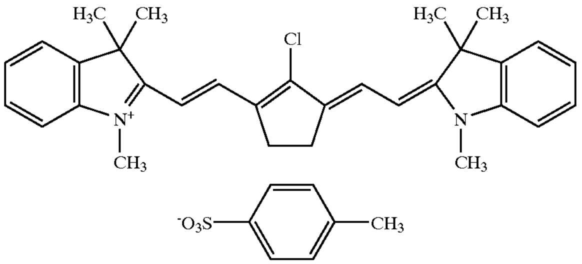

IR-1

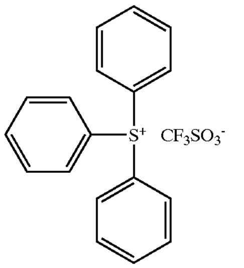

S-1

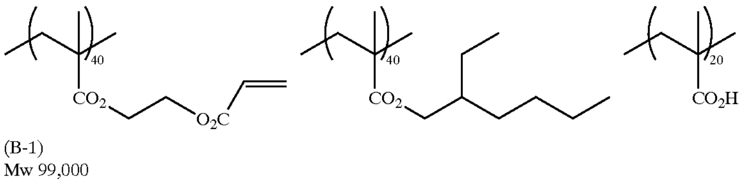

(B-1)
Mw 99,000
Tg 60 C

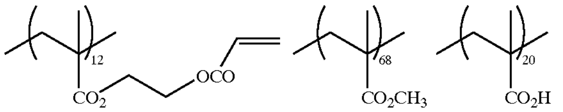

(B-2)
Mw 99,000
Tg 95° C.

Evaluation of the Planographic Printing Plate Precursor

Each of the resultant planographic printing plate precursors was stored at room temperature for 3 days and then exposed to laser light, or stored at 60° C. for 3 days without exposure to laser light, and then measured for the degree of insolubilization in dimethyl sulfoxide as an index of sensitivity of the recording layer, in order to evaluate the degree of cure by light exposure and stability during storage. The light exposure conditions are as follows. The evaluation results are shown in Table 4 below.

Light Exposure

Exposure to light under the conditions of a power of 6.5 W, an external drum revolution number of 81 rpm, an energy of 188 mJ/$cm^2$ on the plate and a resolution of 2400 dpi by a light-exposing machine (trade name: Trendsetter-3244VFS (manufactured by CREO Co., Ltd.) equipped with a water-cooling 40-W infrared semiconductor laser.

TABLE 4

| | Polymeric compound (content) | Content of carbon-carbon double bonds (meq/g) | Radical-polymerizable compound (content) | Degree of insolubilization with exposure to laser light (%) | Degree of insolubilization with time without exposure to light (%) |
|---|---|---|---|---|---|
| Example 1 | Polymeric compound 4 1.0 g | 2.1 | DPHA 1.0 g | 80 | 0 |
| Example 2 | Polymeric compound 3 1.0 g | 2.7 | DPHA 1.0 g | 75 | 0 |
| Example 3 | Polymeric compound 11 1.0 g | 2.5 | DPHA 1.0 g | 77 | 0 |
| Example 4 | Polymeric compound 16 1.0 g | 2.4 | DPHA 1.0 g | 73 | 0 |
| Comparative Example 1 | B-1 1.0 g | 2.3 | DPHA 1.0 g | 75 | 40 |
| Comparative Example 2 | B-2 1.0 g | 1.1 | DPHA 1.0 g | 25 | 0 |

As is evident from Table 4, each planographic printing plate using the image recording material of the invention was highly cured by laser light exposure and did not undergo curing with time during storage in a high-temperature atmosphere, thus achieving a high degree of cure by light exposure and excellent stability during storage. On the other hand, the planographic printing plate in Comparative Example 1, in which the specific alkali-soluble polymer in the invention was not used, achieved a similar degree of cure, but the recording layer was cured with time, so there was a problem with stability during storage.

Examples 5 to 10 and Comparative Examples 2 to 3

An aluminum substrate similar to that of Example 1 was coated with a prime-layer coating solution shown below, and dried for 30 seconds in an atmosphere at 80° C. The amount of the coating after drying was 10 mg/$m^2$.

Prime-Layer Coating Solution

The following ingredients were mixed to prepare a prime-layer coating solution.

| | |
|---|---|
| 2-Aminoethyl phosphonic acid | 0.5 g |
| Methanol | 40 g |
| Pure water | 60 g |

The recording layer coating solution (P-2) shown below was prepared, applied via a wire bar onto the undercoating formed on the substrate, and dried at 115° C. for 45 seconds in a hot-air oven to give a planographic printing plate precursor. The amount of the coating after drying was in the range of 1.2 to 1.3 g of/$m^2$.

The alkali-soluble polymers used in the Examples are the specific alkali-soluble polymers obtained in the Synthesis Examples, and ATMMT is pentaerythritol tetraacrylate.

Recording Layer Coating Solution (P-2)

Alkali-soluble polymer: Component (A) (compound shown in

| | |
|---|---|
| Alkali-soluble polymer: Component (A) (compound shown in Table 5, in the amount shown in Table 5) | |
| Radical-polymerizable compound: Component (D) (compound shown in Table 5, in the amount shown in Table 5) | |
| IR absorber "IR-2": Component (B) | 0.08 g |
| Polymerization initiator "S-2": Component (C) | 0.30 g |
| Victoria Pure Blue naphthalene sulfonate | 0.04 g |
| Fluorine-type surfactant | 0.01 g |
| (trade name: Megafack F-176, from Dainippon Ink and Chemicals, Incorporated) | |
| N-nitro-N-phenyl hydroxyl amine aluminum | 0.001 g |
| Methyl ethyl ketone | 9.0 g |
| Methanol | 10.0 g |
| 1-Methoxy-2-propanol | 8.0 g |

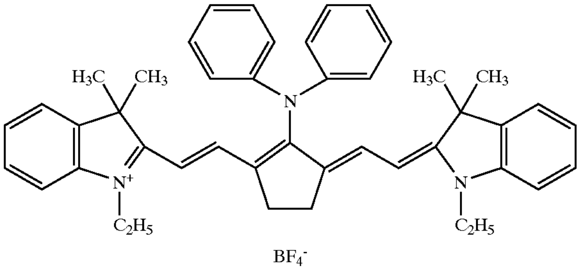

IR-2

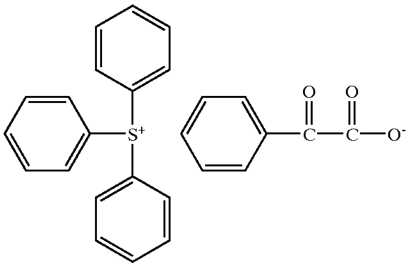

S-2

-continued

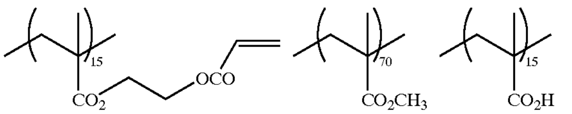

(B-3)
Mw 5,000
Tg 56° C.
Content of carbon-carbon double bond: 1.4 meq/g

Light Exposure

The resultant planographic printing plate precursor was exposed to light under the conditions of a power of 9 W, an external drum revolution number of 210 rpm, an energy of 133 mJ/cm$^2$ on the plate and a resolution of 2400 dpi by a light-exposing machine (trade name: Trendsetter-3244VFS, manufactured by CREO Co., Ltd.) equipped with a water-cooling 40-W infrared semiconductor laser.

Development Treatment

After light exposure, the planographic printing plate precursor was subjected to development by an automatic developing machine (trade name: Stabron900NP, manufactured by Fuji Photo Film Co., Ltd.). As the developing solution, "D-1" shown below was used as the charge solution, while "D-2" below was used as the supplementary solution. The temperature of the development bath was 30° C., and the development time was 12 seconds. The supplementary solution was automatically introduced so that the electrical conductance of the developing solution in the automatic developing machine was kept constant. The finisher used was a solution of FN-6 (trade name) (Fuji Photo

| | |
|---|---|
| (Developing solution [D-1]) | |
| Potassium hydroxide | 3 g |
| Potassium bicarbonate | 1 g |
| Potassium carbonate | 2 g |
| Sodium sulfite | 1 g |
| Polyethylene glycol mononaphthyl ether | 150 g |
| Sodium dibutyl naphthalene sulfonate | 50 g |
| Ethylene diamine tetraacetate tetrasodium | 8 g |
| Water | 785 g |
| (Developing solution [D-2]) | |
| Potassium hydroxide | 6 g |
| Potassium carbonate | 2 g |
| Sodium sulfite | 1 g |
| Polyethylene glycol mononaphthyl ether | 150 g |
| Sodium dibutyl naphthalene sulfonate | 50 g |
| Potassium hydroxyethane diphosphonate | 4 g |
| Silicon TSA-731 (trade name, from GE Toshiba Silicones) | 0.1 g |
| Water | 786.9 g |

Evaluation of Printing Resistance

Then, the planographic printing plate precursor was used in printing with a printing machine (trade name: Lithron manufactured by Komori Corporation). How many prints with ink kept at sufficient concentration could be obtained in printing was determined with naked eyes, to evaluate printing resistance. The results are collectively shown in Table 5.

TABLE 5

| | Polymeric compound (content) | Radical-polymerizable compound (content) | Printing resistance |
|---|---|---|---|
| Example 5 | Polymeric compound 1 | none | 60,000 prints |
| Example 6 | Polymeric compound 3 | none | 70,000 prints |
| Example 7 | Polymeric compound 11 | none | 75,000 prints |
| Example 8 | Polymeric compound 4 | DPHA 1.0 g | 65,000 prints |
| Example 9 | Polymeric compound 12 | DPHA 1.0 g | 67,000 prints |
| Example 10 | Polymeric compound 15 | U-1 1.0 g | 64,000 prints |
| Comparative Example 3 | B-1 2.0 g | none | 2,000 prints |
| Comparative Example 4 | B-1 1.0 g | DPHA 1.0 g | 10,000 prints |
| Comparative Example 5 | B-2 1.0 g | DPHA 1.0 g | 7,000 prints |
| Comparative Example 6 | B-3 1.0 g | DPHA 1.0 g | 3,000 prints |

As can be seen from the results in Table 5, each planographic printing plate using the image recording material of the invention as the recording layer has achieved superior printing resistance to that of Comparative Examples 2 and 3.

Examples 11 to 14 and Comparative Example 4

Preparation of a Substrate

After the surface of an aluminum plate of 0.30 mm in thickness was roughened by graining with a nylon brush and an aqueous suspension of 400-mesh pumiston (phonetic), and washed sufficiently with water. The plate was etched by dipping it for 60 seconds in 10 weight-% aqueous sodium hydroxide at 70° C., then washed with running water, neutralized and washed with 20 weight-% nitric acid and washed with water. The substrate was subjected to electrolytic graining with a sine-wave electric current in an alternating waveform at 12.7 V in 1 weight-% aqueous nitric acid at 160 C/dm$^2$ at the side of the anode. The surface roughness was determined to be 0.6 μm (expressed in Ra). Thereafter, the substrate was dipped for 2 minutes in 30 weight-% aqueous sulfuric acid at 55° C. to remove smuts therefrom and then anodized for 2 minutes at a current density of 2 A/dm$^2$ in 20 weight-% aqueous sulfuric acid to form a 2.7 g of/m$^2$ anodized film. Then, the aluminum plate was coated with a undercoating solution described later, and then dried in an atmosphere at 80° C. for 30 seconds. The amount of the coating after drying was 10 mg/m$^2$.

Formation of a Recording Layer

The recording layer coating solution (P-3) below was prepared, applied via a wire bar onto the aluminum substrate obtained in the manner described above, and dried at 115° C. for 45 seconds in a hot-air oven to form a recording layer thereon, to give a planographic printing plate precursor. The amount of the coating after drying was in the range of 1.2 to 1.3 g of/m$^2$. The planographic printing plate was subjected to laser scanning light exposure and development under the same conditions as in Example 5.

Recording Layer Coating Solution (P-3)

Alkali-soluble polymer: Component (A) (compound shown in Table 6, in the amount shown in Table 6)

| | |
|---|---|
| Radical-polymerizable compound: | |
| Component (D) (compound shown in Table 6, in the amount shown in Table 6) | |
| IR absorber "IR-2": Component (B) | 0.08 g |
| Sulfonium salt "S-1": Component (C) | 0.30 g |
| Victoria Pure Blue naphthalene sulfonate | 0.04 g |
| Fluorine-type surfactant | 0.01 g |
| (trade name: Megafack F-176, from Dainippon Ink and Chemicals, Incorporated) | |
| t-Butyl catechol | 0.001 g |
| Methyl ethyl ketone | 9.0 g |
| Methanol | 10.0 g |
| 1-Methoxy-2-propanol | 8.0 g |

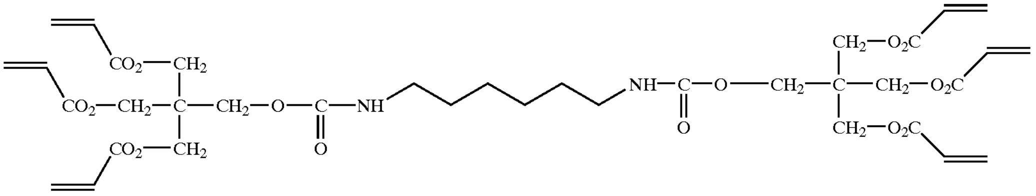

U-1

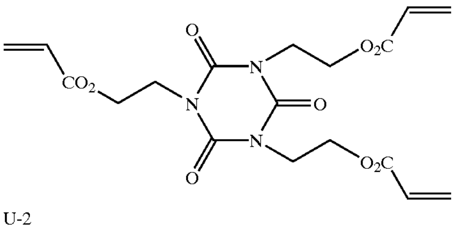

U-2

The printing plate was used in printing in the same manner as in Example 5 and evaluated for sensitivity, printing resistance and staining. Separately, each of the resultant planographic printing plate precursors was allowed to stand at 60° C. for 3 days, or at 45° C. in 75% relative humidity for 3 days, and then used in printing in the same manner as above. The results are collectively shown in Table 6.

TABLE 6

| | Polymeric compound (content) | Radical-polymerizable compound (content) | Printing resistance/staining in non-image portion: Not allowed to stand | 60° C., 3 days | 45°0 C., 75% humidity, 3 days |
|---|---|---|---|---|---|
| Example 11 | Polymeric compound 1 2.0 g | none | 60,000 prints no stain | 60,000 prints no stain | 60,000 prints no stain |
| Example 12 | Polymeric compound 11 2.0 g | none | 55,000 prints no stain | 55,000 prints no stain | 55,000 prints no stain |
| Example 13 | Polymeric compound 11 1.0 g | DPHA 0.5 g U-1 0.5 g | 65,000 prints no stain | 65,000 prints no stain | 65,000 prints no stain |
| Example 14 | Polymeric compound 17 1.0 g | DPHA 0.5 g U-2 0.5 g | 63,000 prints no stain | 63,000 prints no stain | 63,000 prints no stain |
| Comparative Example 7 | B-1 1.0 g | DPHA 0.5 g U-1 0.5 g | 20,000 prints no stain | 18,000 prints staining | 10,000 prints staining |
| Comparative Example 8 | B-2 1.0 g | DPHA 0.5 g U-1 0.5 g | 15,000 prints no stain | 15,000 prints no stain | 15,000 prints no stain |

As can be seen from Table 6, each planographic printing plate using the image recording material of the invention as the recording layer was excellent in printing resistance without staining on the non-image portion and superior in stability with time without a reduction in printing resistance or stain resistance on the non-image portion, even after storage in the high-temperature and high-humidity environment.

Examples 15 to 18 and Comparative Example 5

Preparation of a Substrate

After the surface of an aluminum plate of 0.30 mm in thickness was roughened by graining with a nylon brush and an aqueous suspension of 400-mesh pumiston (phonetic), and washed sufficiently with water. The plate was etched by dipping it for 60 seconds in 10 weight-% aqueous sodium hydroxide at 70° C., then washed with running water, neutralized and washed with 20 weight-% nitric acid and washed with water. The substrate was subjected to electrolytic graining with a sine-wave electric current in an alternating waveform at 12.7 V in 1 weight-% aqueous nitric acid at 160 $C/dm^2$ at the side of the anode. The surface roughness was determined to be 0.6 μm (expressed in Ra). Thereafter, the substrate was dipped for 2 minutes in 30 weight-% aqueous sulfuric acid at 55° C. to remove smuts therefrom and then anodized for 2 minutes at a current density of 2 $A/dm^2$ in 20 weight-% aqueous sulfuric acid to form a 2.7 g of/$m^2$ anodized film.

Formation of a Undercoating Layer

A liquid composition (sol) in the SG method was prepared by the procedure described below.

| Sol composition | |
|---|---|
| Methanol | 130 g |
| Water | 20 g |
| 85 weight - % phosphoric acid | 16 g |
| Tetraethoxysilane | 50 g |
| 3-Methacryloxypropyl trimethoxysilane | 60 g |

The above components for the sol composition were mixed and stirred. About 5 minutes later, exothermic reaction was recognized. The mixture was reacted for 60 minutes and then transferred to another vessel, and 3000 g of methanol was added to it, to give sol.

This sol was diluted with methanol/ethylene glycol (9/1 by weight) and applied onto the substrate to give a coating containing Si in an amount of 30 $mg/m^2$ thereon, and the coating was dried at 100° C. for 1 minute.

The recording layer coating solution (P-4) having the composition shown below was applied via a wire bar onto the prime coating on the aluminum substrate thus treated, and dried at 115° C. for 45 seconds in a hot-air oven to prepare a planographic printing plate precursor. The amount of the coating after drying was in the range of 1.2 to 1.3 g of/$m^2$.

Recording Layer Coating Solution (P-4)

Alkali-soluble polymer: Component (A) (compound shown in Table 7, in the amount shown in Table 7)

Radical-polymerizable compound: Component (D) (compound shown in Table 7, in the amount shown in Table 7)

| | |
|---|---|
| Alkali-soluble polymer: Component (A) (compound shown in Table 7, in the amount shown in Table 7) | |
| Radical-polymerizable compound: Component (D) (compound shown in Table 7, in the amount shown in Table 7) | |
| IR absorber "IR-1": Component (B) | 0.08 g |
| Sulfonium salt "S-1": Component (C) | 0.30 g |
| Victoria Pure Blue naphthalene sulfonate | 0.04 g |
| Fluorine-type surfactant (trade name: Megafack F-176, from Dainippon Ink and Chemicals, Incorporated) | 0.01 g |
| Methyl ethyl ketone | 9.0 g |
| Methanol | 10.0 g |
| p-Methoxy phenol | 0.001 g |
| 1-Methoxy-2-propanol | 8.0 g |

Light Exposure

The resultant planographic printing plate was exposed to light under the conditions of a power of 250 mW per beam, an external drum revolution number of 800 rpm and a resolution of 2400 dpi by a light-exposing machine (trade name: Luxel T-9000CTP manufactured by Fuji Photo Film Co., Ltd.) equipped with a multi-channel head.

Development Treatment

After light exposure, the planographic printing plate precursor was subjected to development by an automatic developing machine (trade name: Stabron 900N, manufactured by Fuji Photo Film Co., Ltd.). As the developing solution, both the charge solution and its supplementary solution were solutions of DP-4 (trade name) (Fuji Photo Film Co., Ltd.) diluted with water in a ratio of 1:8. The temperature of the development bath was 30° C. The finisher used was a solution of GU-7 (trade name) (Fuji Photo Film Co., Ltd.) diluted with water in a ratio of 1:2.

Evaluation of Printing Resistance and Staining

Then, the planographic printing plate was used in printing with a printing machine (trade name: SOR-KZ manufactured by Heidelberg) How many prints with ink kept at sufficient concentration could be obtained in printing was determined to evaluate printing resistance. The resultant prints were evaluated with naked eyes for staining on the non-image portion. The results are collectively shown in Table 7.

TABLE 7

| | Polymeric compound (content) | Radical-polymerizable compound (content) | Printing resistance | Staining on non-image portion |
|---|---|---|---|---|
| Example 15 | Polymeric compound 2 2.0 g | none | 80,000 prints | no stain |
| Example 16 | Polymeric compound 2 1.0 g | DPHA 1.0 g | 82,000 prints | no stain |
| Example 17 | Polymeric compound 19 2.0 g | DPHA 1.0 g | 85,000 prints | no stain |
| Example 18 | Polymeric compound 5 1.0 g | DPHA 1.0 g | 81,000 prints | no stain |
| Comparative Example 5 | B-1 1.0 g | DPHA 1.0 g | 20,000 prints | staining |

As can be seen from Table 7, each planographic printing plate using the image recording material of the invention as the recording layer was excellent in printing resistance without staining on the non-image portion.

The image recording material of the invention comprises an alkali-soluble polymer with specific Tg having an unsaturated group in a side chain thereof and is thus excellent in stability during storage and superior in image formability with high-strength image portions. Further, when the image forming material of the invention is used as a recording layer for a planographic printing plate precursor, the planographic printing plate precursor is excellent in stability during storage and can be used in printing with an infrared laser to achieve excellent printing resistance.

What is claimed is:

1. A negative image recording material on which an image is formable by exposure, comprising:

(A) a specific polymer compound that has at least one carbon—carbon double bond in a side chain thereof and a glass transition temperature of 80° C. or more, and is soluble in an aqueous alkaline solution;

(B) a light-heat converting agent; and (C) a compound that generates radicals by exposure using light of a wavelength absorbable by the light-heat converting agent.

2. The negative image recording material according to claim 1, further comprising (D) a radical-polymerizable compound.

3. The negative image recording material according to claim 1, wherein the glass transition temperature of the (A) specific polymer compound is 100° C. or more.

4. The negative image recording material according to claim 1, wherein the (A) specific polymer compound contains at least 1.5 meq/g of the carbon—carbon double bond in the side chain thereof.

5. The negative image recording material according to claim 1, wherein the (A) specific polymer compound has at least one amide group in a side chain thereof.

6. The negative image recording material according to claim 1, wherein the (A) specific polymer compound has at least one constituent unit derived from a styrene derivative.

7. The negative image recording material according to claim 1, wherein the principal chain structure of the (A) specific polymer compound includes at least one selected from the group consisting of poly(meth)acryl resin, polystyrene resin, polyurethane resin, and acetal-denatured polyvinyl resin.

8. The negative image recording material according to claim 1, wherein the (A) specific polymer compound includes, in a side chain thereof, at least one of the groups represented by the general formulae (1) to (3):

(1)

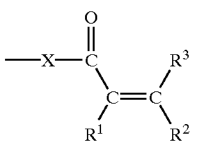

(2)

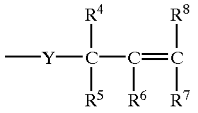

(3)

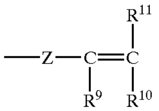

wherein $R^1$ to $R^{11}$ independently represent a monovalent organic group; X and Y independently represent an oxygen atom, sulfur atom or —N($R^{12}$)—; and Z represents an oxygen atom, sulfur atom, —N($R^{13}$)— or optionally substituted phenylene group.

9. The negative image recording material according to claim 6, wherein the (A) specific polymer compound contains the constituent unit derived from the styrene derivative at least 30 mol-% relative to 100 mol-% of the total units in the polymer.

10. The negative image recording material according to claim 6, wherein the side-chain structure represented by the general formulae (1), (2) and (3) is linked to a constituent unit of a styrene derivative constituting the (A) specific polymer compound.

11. The negative image recording material according to claim 6, wherein the constituent unit derived from the styrene derivative constituting the (A) specific polymer compound has a structure represented by the general formula (4):

(4)

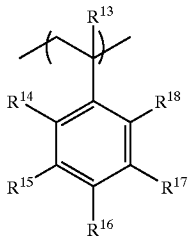

wherein $R^{13}$ represents a hydrogen atom or a $C_{1-5}$ alkyl group; and $R^{14}$ to $R^{18}$ independently represent a monovalent organic group.

12. The negative image recording material according to claim 6, wherein the constituent unit derived from the styrene derivative constituting the (A) specific polymer compound is represented by the general formula (5):

(5)

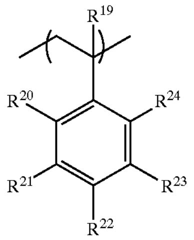

wherein $R^{19}$ represents a hydrogen atom or a $C_{1-5}$ alkyl group, and $R^{20}$ to $R^{24}$ independently represent a monovalent organic group, with at least one of $R^{20}$ to $R^{24}$ having a structure represented by the general formula (1), (2) or (3).

13. The negative image recording material according to claim 1, wherein the weight average molecular weight of the (A) specific polymer compound is 6,000 or more.

14. The negative image recording material according to claim 1, wherein the weight average molecular weight of the (A) specific polymer compound is 50,000 to 200,000.

15. A negative image recording material on which an image is formable by exposure, comprising:

(A) a specific polymer compound that has at least one carbon—carbon double bond in a side chain thereof and a glass transition temperature of 80° C. or more, and is soluble in an aqueous alkaline solution;

(B) a light-heat converting agent; and (C) a compound that generates radicals by exposure using light of a wavelength absorbable by the light-heat converting agent, wherein a softening temperature of an image recording layer formed by (A), (B) and (C) is 60° C. or more.

16. A planographic printing plate precursor that includes a hydrophilic support and a photosensitive layer on the support, wherein the photosensitive layer comprises:

(A) a specific polymer compound that has at least one carbon—carbon double bond in a side chain thereof and a glass transition temperature of 80° C. or more, and is soluble in an aqueous alkaline solution;

(B) a light-heat converting agent; and (C) a compound that generates radicals by exposure using light of a wavelength absorbable by the light-heat converting agent, wherein the planographic printing plate precursor is exposable to a light having a power density of at least 5000 W/$cm^2$.

* * * * *